(12) United States Patent
Yamamoto et al.

(10) Patent No.: US 9,518,838 B2
(45) Date of Patent: Dec. 13, 2016

(54) SLAVE SUITABLE FOR ENERGY MANAGEMENT SYSTEMS AND ENERGY MANAGEMENT SYSTEM

(71) Applicant: PANASONIC CORPORATION, Osaka (JP)

(72) Inventors: Shinji Yamamoto, Osaka (JP); Masaki Koyama, Osaka (JP); Takayuki Sasaki, Osaka (JP); Tomoaki Mizuta, Osaka (JP); Tomohide Furuya, Osaka (JP); Kenji Kuniyoshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 162 days.

(21) Appl. No.: 14/377,832

(22) PCT Filed: Feb. 26, 2013

(86) PCT No.: PCT/JP2013/001137
§ 371 (c)(1),
(2) Date: Aug. 8, 2014

(87) PCT Pub. No.: WO2013/128903
PCT Pub. Date: Sep. 6, 2013

(65) Prior Publication Data
US 2015/0345986 A1 Dec. 3, 2015

(30) Foreign Application Priority Data

Mar. 1, 2012 (JP) ................................. 2012-045770
Jul. 11, 2012 (JP) ................................. 2012-155693

(51) Int. Cl.
| G08C 19/16 | (2006.01) |
| G06Q 50/06 | (2012.01) |
| G01D 4/00 | (2006.01) |
| H04B 3/54 | (2006.01) |
| H04Q 9/00 | (2006.01) |

(52) U.S. Cl.
CPC .............. *G01D 4/004* (2013.01); *H04B 3/546* (2013.01); *H04Q 9/00* (2013.01);
(Continued)

(58) Field of Classification Search
CPC combination set(s) only.
See application file for complete search history.

(56) References Cited

U.S. PATENT DOCUMENTS

2003/0219002 A1 11/2003 Kishida
2004/0034603 A1* 2/2004 Hastings ................. G06F 21/34
705/63

(Continued)

FOREIGN PATENT DOCUMENTS

JP    09-163007 A    6/1997
JP    2003-249973 A  9/2003
(Continued)

OTHER PUBLICATIONS

International Search Report issued in PCT/JP2013/001137, dated May 28, 2013, with English translation.

*Primary Examiner* — Brian Zimmerman
*Assistant Examiner* — Cal Eustaquio
(74) *Attorney, Agent, or Firm* — McDermott Will & Emery LLP

(57) ABSTRACT

The slave is used in an energy management system for collecting meter-reading data from an energy meter for measuring an amount of electric energy supplied from a power source to a predetermined place through a distribution line. The slave includes: a first interface unit configured to communicate with an upper device; a second interface unit configured to communicate with an electric appliance installed in the predetermined place; and a third interface unit configured to perform first wireless communication using an electric wave with a communication terminal. One (Continued)

of the first interface unit and the second interface unit is a wired communication unit configured to perform power line communication using the distribution line, and the other of the first interface unit and the second interface unit is a wireless communication unit configured to perform second wireless communication using an electric wave.

10 Claims, 5 Drawing Sheets

(52) U.S. Cl.
CPC . *H04B 2203/5433* (2013.01); *H04Q 2209/30* (2013.01); *H04Q 2209/40* (2013.01); *H04Q 2209/60* (2013.01); *H04Q 2209/70* (2013.01); *H04Q 2209/82* (2013.01); *H04Q 2209/88* (2013.01)

(56) References Cited

U.S. PATENT DOCUMENTS

| | | | | |
|---|---|---|---|---|
| 2008/0177678 | A1* | 7/2008 | Di Martini | G01D 4/002 705/412 |
| 2012/0249339 | A1* | 10/2012 | Hanley | G06Q 50/06 340/870.02 |

FOREIGN PATENT DOCUMENTS

| | | |
|---|---|---|
| JP | 2004-280499 A | 10/2004 |
| JP | 2008-216243 A | 9/2008 |
| JP | 2010-004265 A | 1/2010 |
| JP | 2011-009890 A | 1/2011 |
| JP | 2011-114448 A | 6/2011 |
| JP | 2011-250301 A | 12/2011 |
| JP | 2012-039314 A | 2/2012 |

* cited by examiner

| Channel | 0 | 1 | 2 | 3 | 4 | 5 | 6 | 7 | 8 | 9 |
|---|---|---|---|---|---|---|---|---|---|---|
| Identification Information | | 11 | 02 | 23 | 24 54 | 15 75 85 | 36 | | | |

| Channel | 0 | 1 | 2 | 3 | 4 | 5 | 6 | 7 | 8 | 9 |
|---|---|---|---|---|---|---|---|---|---|---|
| Identification Information | 10 | | 02 | 23 | 24 | 15 | 36 | 54 | 75 | 85 |

| Channel | 0 | 1 | 2 | 3 | 4 | 5 | 6 | 7 | 8 | 9 |
|---|---|---|---|---|---|---|---|---|---|---|
| Identification Information | ✗ | 10 | 02 | 23 | 24 | 15 | 36 | 54 | 75 | 85 |

SLAVE SUITABLE FOR ENERGY MANAGEMENT SYSTEMS AND ENERGY MANAGEMENT SYSTEM

RELATED APPLICATIONS

This application is the U.S. National Phase under 35 U.S.C. §371 of International Application No. PCT/JP2013/001137, filed on Feb. 26, 2013, which in turn claims the benefit of Japanese Application No. 2012-045770, filed on Mar. 1, 2012, and Japanese Application No. 2012-155693, filed on Jul. 11, 2012, the disclosures of which Applications are incorporated by reference herein.

TECHNICAL FIELD

The present invention relates to slaves suitable for energy management systems and energy management systems, and particularly to a slave which is suitable for energy management systems and functions to transmit meter-reading data containing an amount of electric energy measured by an energy meter in a facility to an upper device, and an energy management system.

BACKGROUND ART

In the past, there has been proposed a remote measurement system configured such that energy meters measure energy consumptions in facilities and a master (master terminal) periodically obtains measurement results as meter-reading data from slaves (slave terminals) attached to the energy meters (see document 1 [JP 2011-250301 A]).

In the system disclosed in document 1, the master communicates with an upper server (upper aggregation server) through a communication network. The upper server may be operated by an electric power company. The master obtains the meter-reading data of the individual energy meters from the slaves, aggregates to form meter-reading information, and sends the meter-reading information to the upper server. Thus, the system enables remote meter-reading.

In the system disclosed in document 1, communication between the slave and an upper device (e.g., the master and the upper server) is performed by power line communication using distribution lines as communication paths. If the power line communication is not available, wireless communication is used.

Document 1 also discloses that, in a situation where nodes (slaves and upper devices) are not arranged adjacent to each other, communication between the nodes is established by way of additional devices relaying wireless communication. For example, when maintenance terminals that are used for maintenance and inspection and perform wireless communication with the slaves and the upper devices are used as relay devices, communication paths between the slaves and the upper devices are ensured.

Recently, there has been proposed that the slave attached to the energy meter is configured to communicate with the electric appliance used in the facility in addition to the upper device. This configuration allows the electric appliance to visually indicate the energy consumption of the facility by displaying the measurement result of the energy meter, for example. Further, the configuration allows the electric power company to control the electric appliance by signals for the purpose of suppressing the peak of the energy demand (i.e., peak cut).

However, the boundaries of responsibility between the electric power companies and the consumers are given by the energy meters. When the slave attached to the energy meter has the function of communicating with the upper device and the maintenance terminal for maintenance and inspection, and additionally has the function of communicating with the electric appliance in the facility, undesired effects caused by traffic between different communications is not ignorable. In other words, occurrence of interference of the communication between the slave and the upper device and the communication between the slave and the electric appliance is undesirable.

SUMMARY OF INVENTION

In view of the above insufficiency, the present invention has aimed to propose a slave for energy management systems and an energy management system that are allowing communication with not only an upper device but also an electric appliance used in a facility, and capable of avoiding interference between communication with the upper device and communication with the electric appliance.

The slave suitable for energy management systems of the first aspect in accordance with the present invention is a slave suitable for energy management systems for collecting, from an energy meter for measuring an amount of electric energy supplied from a power source to a predetermined place through a distribution line, meter-reading data containing the amount of electric energy. The slave includes a first interface unit, a second interface unit, a third interface unit, and a controller. The first interface unit is configured to communicate with the upper device. The second interface unit is configured to communicate with an electric appliance installed in the predetermined place. The third interface unit is configured to perform first wireless communication using an electric wave with the communication terminal. The controller has: a function of obtaining the meter-reading data from the energy meter; a function of controlling the first interface unit to send the meter-reading data to the upper device; and a function of controlling the third interface unit to send the meter-reading data to the communication terminal. One of the first interface unit and the second interface unit is a wired communication unit configured to perform power line communication using the distribution line, and the other of the first interface unit and the second interface unit is a wireless communication unit configured to perform second wireless communication using an electric wave.

According to the slave suitable for energy management systems of the second aspect in accordance with the present invention, depending on the first aspect, the energy meter is connected to the power source through a transformer configured to adjust electricity from the power source to electricity appropriate to the predetermined place. The distribution line includes a first path between the power source and the transformer, and a second path between the transformer and the energy meter. The upper device is connected to the second path. The first interface unit is the wired communication unit and is configured to perform power line communication with the upper device through the second path.

According to the slave suitable for energy management systems of the third aspect in accordance with the present invention, depending on the first aspect, the electric appliance is connected to the distribution line. The energy meter is interposed between the power source and the electric appliance in the distribution line. The distribution line includes a first distribution line between the energy meter and the power source, and a second distribution line between the energy meter and the electric appliance. The second interface unit is the wired communication unit and is configured to perform power line communication with the electric appliance through the second distribution line.

According to the slave suitable for energy management systems of the fourth aspect in accordance with the present invention, depending on the third aspect, the first interface unit is the wireless communication unit. The first interface unit and the third interface unit are configured to use the same protocol.

According to the slave suitable for energy management systems of the fifth aspect in accordance with the present invention, depending on the third aspect, the first interface unit is the wireless communication unit. The first interface unit and the third interface unit are configured to use different protocols.

According to the slave suitable for energy management systems of the sixth aspect in accordance with the present invention, depending on any one of the first to fifth aspects, the controller includes a channel selector, an interference evaluator, and a change instructor. The channel selector is configured to select a communication channel to be used for wireless communication from a plurality of channels. The interference evaluator is configured to judge whether interference of electric waves occurs in the communication channel. The change instructor is configured to provide a change instruction to the channel selector when the interference evaluator determines that the interference occurs. The channel selector is configured to change the communication channel in response to reception of the change instruction from the change instructor.

According to the slave suitable for energy management systems of the seventh aspect in accordance with the present invention, depending on the sixth aspect, the controller includes an identification information holding unit storing identification information unique to the slave. The channel selector is configured to select from the plurality of channels an initial channel as a candidate for the communication channel, depending on the identification information stored in the identification information holding unit. The channel selector is configured to, when receiving the change instruction from the change instructor, select from the plurality of channels a channel different from the initial channel, and set the selected channel as the communication channel. The channel selector is configured to, when not receiving the change instruction from the change instructor, set the initial channel as the communication channel.

According to the slave suitable for energy management systems of the eighth aspect in accordance with the present invention, depending on the sixth or seventh aspect, the interference evaluator is configured to judge whether the plurality of channels includes at least one available channel that does not cause interference of the electric wave. The interference evaluator is configured to, when determining that the plurality of channels includes the available channel, provide available channel information identifying the at least one available channel to the change instructor. The change instructor is configured to select a designated available channel to be set as the communication channel from the at least one available channel identified by the available channel information, and provide the change instruction indicating the designated available channel to the channel selector. The channel selector is configured to, when receiving the change instruction from the change instructor, set the designated available channel indicated by the change instruction as the communication channel.

According to the slave suitable for energy management systems of the ninth aspect in accordance with the present invention, depending on any one of the sixth to eighth aspects, the controller further includes a communication quality evaluator and a power instructor. The communication quality evaluator is configured to evaluate a communication quality of the communication channel selected by the channel selector. The power instructor is configured to set an intensity of an electric wave allocated to the communication channel to a lower limit of a range of intensities allowing the communication quality evaluated by the communication quality evaluator to satisfy a predetermined condition.

According to the slave suitable for energy management systems of the tenth aspect in accordance with the present invention, depending on any one of the sixth to ninth aspects, the channel selector is configured to designate a second communication channel to be used for the second wireless communication. The third interface unit is configured to judge whether use of the communication terminal is started. The change instructor is configured to, when the third interface unit determines that use of the communication terminal is started, provide to the channel selector the change instruction that indicates, as the second communication channel, a channel that does not cause interference with a channel used by the communication terminal. The channel selector is configured to, when receiving the change instruction from the change instructor, change the second communication channel to the channel indicated by the change instructor.

According to the slave suitable for energy management systems of the eleventh aspect in accordance with the present invention, depending on the tenth aspect, the controller further includes a second communication quality evaluator and a second power instructor. The second communication quality evaluator is configured to evaluate a communication quality of the second communication channel selected by the channel selector. The second power instructor is configured to set an intensity of an electric wave allocated to the second communication channel to a lower limit of a range of intensities allowing the communication quality evaluated by the second communication quality evaluator to satisfy a predetermined condition.

According to the slave suitable for energy management systems of the twelfth aspect in accordance with the present invention, depending on any one of the sixth to eleventh aspects, each of the plurality of channel is defined by a frequency, a time slot, or a combination of a frequency and a time slot.

According to the slave suitable for energy management systems of the thirteenth aspect in accordance with the present invention, depending on the seventh aspect, the identification information is given by the upper device to the slave.

According to the slave suitable for energy management systems of the fourteenth aspect in accordance with the present invention, depending on any one of the first to thirteenth aspects, the slave is attached to the energy meter.

The energy management system of the fifteenth aspect in accordance with the present invention includes a slave, an upper device, and a communication terminal. The slave is configured to obtain, from an energy meter for measuring an amount of electric energy supplied from a power source to a predetermined place through a distribution line, meter-reading data containing the amount of electric energy. The upper device is configured to obtain the meter-reading data from the slave. The communication terminal is configured to obtain the meter-reading data from the slave. The slave includes a first interface unit, a second interface unit, a third interface unit, and a controller. The first interface unit is configured to communicate with the upper device. The second interface unit is configured to communicate with an electric appliance installed in the predetermined place. The third interface unit is configured to perform first wireless communication using an electric wave with the communication terminal. The controller has: a function of obtaining the meter-reading data from the energy meter; a function of controlling the first interface unit to send the meter-reading data to the upper device; and a function of controlling the third interface unit to send the meter-reading data to the communication terminal. One of the first interface unit and the second interface unit is a wired communication unit configured to perform power line communication using the distribution line, and the other of the first interface unit and the second interface unit is a wireless communication unit configured to perform second wireless communication using an electric wave.

According to the energy management system of the sixteenth aspect in accordance with the present invention, depending on the fifteenth aspect, the upper device includes a master connected to the distribution line and an upper server connected to the master. The master has a function of obtaining the meter-reading data from the slave, and a function of sending the meter-reading data obtained from the slave to the upper server. The upper server is configured to store the meter-reading data received from the master.

According to the energy management system of the seventeenth aspect in accordance with the present invention, depending on the fifteenth or sixteenth aspect, the communication terminal has a function of communicating with the electric appliance.

DESCRIPTION OF EMBODIMENTS

First Embodiment

Figure 1:
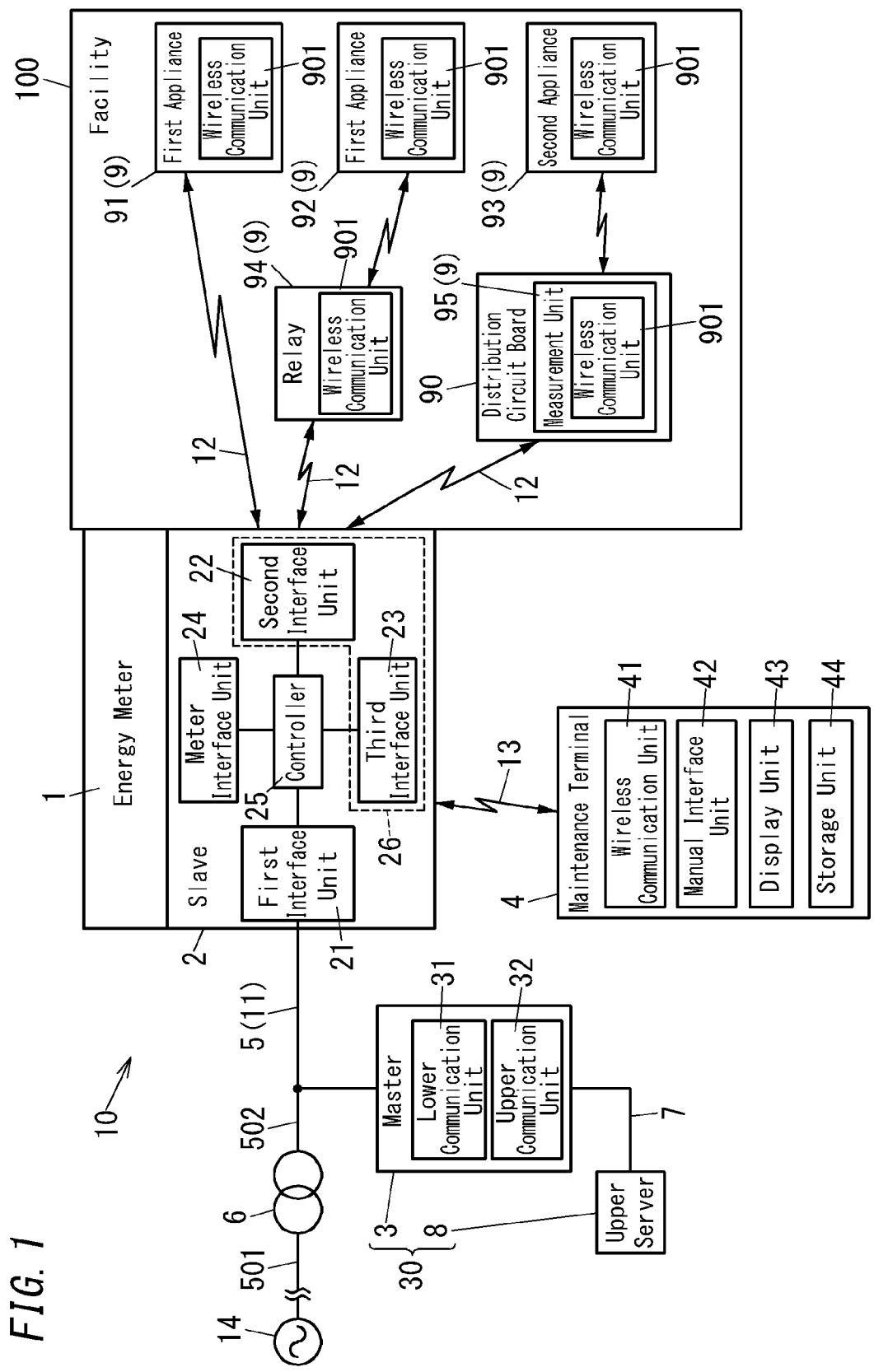
FIG. 1 is a block diagram illustrating a configuration of an energy management system in accordance with the first embodiment.

FIG. 1 shows the energy management system 10 of the present embodiment configured to collect, from an energy meter 1 for measuring an amount of electric energy supplied to a predetermined place (in the present embodiment, a facility 100) from a power source (in the present embodiment, a commercial AC power source) 14 through a distribution line 5, meter-reading data containing the amount of electric energy. Note that, the power source 14 is not limited to a commercial AC power source. Further, the predetermined place is not limited to the facility 100.

The energy management system 10 of the present embodiment includes a slave (communication device) 2, an upper device 30, and a communication terminal (maintenance terminal) 4.

Figure 3:
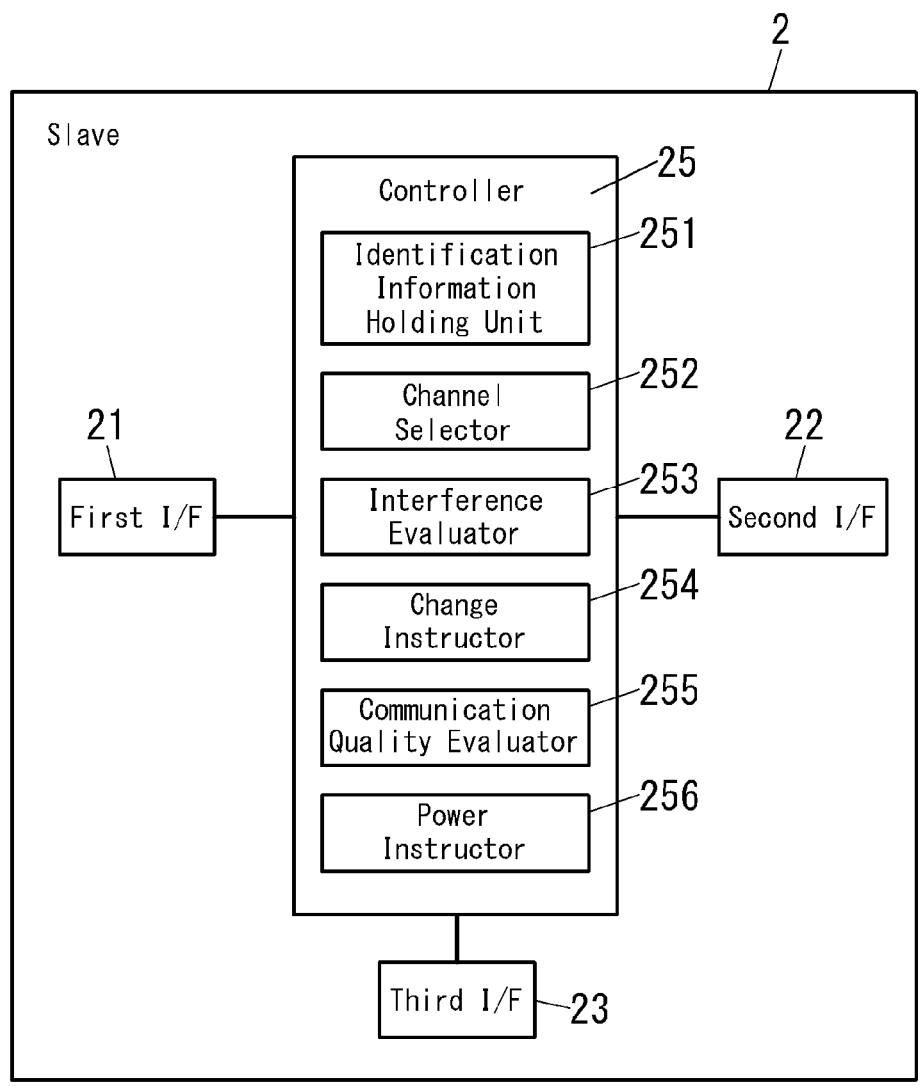
FIG. 3 is a block diagram illustrating a slave used in the energy management system in accordance with the first embodiment.

The slave 2 is configured to obtain the meter-reading data including the amount of electric energy from the energy meter 1. For example, as shown in FIG. 3, the slave 2 includes a first interface unit 21, a second interface unit 22, a third interface unit 23, a meter interface unit 24, and a controller 25.

The first interface unit 21 is used for communication with the upper device 30. In other words, the first interface unit 21 is configured to communicate with the upper device 30. For example, the first interface unit 21 is implemented by a combination of hardware and software necessary to communicate with the upper device 30.

The second interface unit 22 is used for communication with an electric appliance 9 installed in the predetermined place (facility 100). In other words, the second interface unit 22 is configured to communicate with the electric appliance 9. For example, the second interface unit 22 is implemented by a combination of hardware and software necessary to communicate with the electric appliance 9.

Note that, the electric appliance 9 is not necessarily fixed to the predetermined place. The electric appliance 9 may be portable and be placed on the predetermined place. In short, it is sufficient that the electric appliance 9 is available in the predetermined place.

The third interface unit 23 is used for communication with the communication terminal 4. In other words, the third interface unit 23 is configured to communicate with the communication terminal 4. In the present embodiment, the third interface unit 23 is configured to perform wireless communication using an electric wave with the communication terminal 4. For example, the third interface unit 23 is implemented by a combination of hardware and software necessary to communicate with the communication terminal 4.

The meter interface unit 24 is used for communication with the energy meter 1. In other words, the meter interface unit 24 is configured to communicate with the energy meter 1. For example, the meter interface unit 24 is configured to perform near field communication using infrared as transmission medium with the energy meter 1. For example, the meter interface unit 24 is implemented by a combination of hardware and software necessary to communicate with the energy meter 1.

The controller 25 has a function of obtaining the meter-reading data from the energy meter 1. Especially, the controller 25 communicates with the energy meter 1 through the meter interface unit 24 to obtain the meter-reading data from the energy meter 1. Further, the controller 25 has a function of controlling the first interface unit 21 to send the meter-reading data to the upper device 30, and a function of controlling the third interface unit 23 to send the meter-reading data to the communication terminal 4.

The energy meter 1 is connected to the power source 14 through a transformer (step-down transformer) 6 configured to adjust electricity from the power source 14 to electricity appropriate to the predetermined place (facility 100). The distribution line 5 includes a distribution line (first path) 501 between the power source 14 and the transformer 6, and a distribution line (second path) 502 between the transformer 6 and the energy meter 1.

The upper device 30 is connected to the second path 502. The upper device 40 includes a master 3 connected to the distribution line 5 (the second path 502) and an upper server 8 connected to the master 3.

The master 3 has a function of obtaining the meter-reading data from the slave 2, and a function of sending the meter-reading data obtained from the slave 2 to the upper server 8.

The upper server 8 is configured to store the meter-reading data received from the master 3.

The communication terminal 4 has a function of obtaining the meter-reading data from the slave 2, and a function of communicating with the electric appliance 9.

Hereinafter, the energy management system of the present embodiment is described in more detail. As shown in FIG. 1, the energy management system 10 of the present embodiment includes the slave 2 attached to the energy meter 1, the master 3 configured to obtain the meter-reading data of the energy meter 1 from the slave 2, and the maintenance terminal 4 configured to obtain the meter-reading data from the slave 2. Note that, the phrase "the slave 2 is attached to the energy meter 1" means that the slave 2 and the energy meter 1 are installed as a single device. It is preferable that the slave 2 and the energy meter 1 are accommodated in the same casing, but the slave 2 and the energy meter 1 may be accommodated in different casings.

In the following example, the facility 100 is one of dwelling units in a condominium. However, the facility 100 is not limited to such a dwelling unit, but may be a residence, an office, or a factory.

The energy meter 1 is connected to the distribution line 5 for transmitting commercial electricity from the electric power company (electric power supplier). The energy meter 1 is to measure an amount of energy consumed in the facility 100. The energy meter 1 constitutes a so-called smart meter together with the slave 2. The meter-reading data are transmitted to the electric power companies through communication between the master 3 and the slave 2 each connected to the distribution line 5, and thus the remote meter-reading or the like may be achieved. In this regard, the meter-reading data contains at least an amount of energy over a predetermined period of time measured by the energy meter 1 (i.e., an amount of energy consumed in the facility 100).

The communication between the slave 2 and the master 3 is achieved by the power line communications (PLC) using the distribution line 5 as the transmission medium. Hence, a first communication path 11 using the distribution line 5 (the second path 502) on the upstream side of the energy meter 1 as a transmission medium is formed between the slave 2 and the master 3. The slave 2 performs the power line communications with the master 3 through the first communication path 11, and thereby sends the meter-reading data to the master 3. Further, the slave 2 has the functions of communicating with the maintenance terminal 4 and the electric appliance 9 used in the facility 100, in addition to the function of communicating with the master 3, and this is described in detail below.

In this regard, the slave 2 includes the first interface unit 21 configured to communicate with the master 3, the second interface unit 22 configured to communicate with the electric appliance 9, and the third interface unit 23 configured to communicate with the maintenance terminal 4.

The first interface unit 21 is configured to perform bidirectional power line communication with the master 3 through the first communication path 11 using the distribution line 5 on the upstream side of the energy meter 1 as the transmission medium, as described above. Further, the second interface unit 22 is configured to perform bidirectional wireless communication with the electric appliance 9, that is one of electric appliances used in the facility 100 and has a communication function, through the second communication path using an electric wave as a transmission medium. The third interface unit 23 is configured to perform bidirectional wireless communication with the maintenance terminal 4 through the third communication path 13 using an electric wave as a transmission medium.

Each of the first interface unit 21, the second interface unit 22, and the third interface unit 23 sends and receives a packet including a header, a payload, and a trailer. The header includes information for identifying channels individually set to the first communication path 11, the second communication path 12, and the third communication path 13. For example, the channels allocated to the individual communication paths are frequencies for transmitting information. Time slots that are time periods obtained by dividing a communication period are also used as channels for communication. When different channels are allocated to the individual communication paths, information is transmitted without causing interference of different communication paths.

Further, the slave 2 includes the meter interface unit 24 for obtaining the measurement result from the energy meter 1, and the controller 25 for controlling each unit. In this regard, the controller 25 includes, as a main component, a device such as a microcomputer including a processor operating in accordance with a program, and implements various functions by executing predetermined programs. The meter interface unit 24 is designed to be connected to an extension terminal (not shown) of the energy meter 1 through wires, for example. Thus, the meter interface unit 24 can send data to the energy meter 1 and receive data from the energy meter 1. Note that, the meter interface unit 24 is not necessarily configured to be connected to the energy meter 1 in a wired manner. The meter interface unit 24 may be configured to perform wireless communication with the energy meter 1. Alternatively, the meter interface unit 24 may be configured to read out the measurement result by image processing on images of an indicator of the energy meter 1 taken by a camera (not shown).

In summary, the slave 2 uses the meter interface unit 24 to obtain the measurement result of the energy meter 1, and uses the first interface unit 21 to send the obtained measurement result as the meter-reading data to the master 3 through the first communication path 11. Further, the slave 2 uses the second interface unit 22 to send data to or receive data from the electric appliance 9 through the second communication path 12 if necessary. The slave 2 uses the third interface unit 23 to send data to or receive data from the maintenance terminal 4 through the third communication path 13 if necessary. Note that, the slave 2 may include a storage unit (not shown) and be configured to temporarily store the meter-reading data obtained from the energy meter 1 in the storage unit.

Commercial electricity is distributed from an electric power substation to the step-down transformer 6 situated, for example, at a utility pole (not shown) near the facility 100, and a voltage of the commercial electricity is decreased by the step-down transformer 6 and then is supplied to the facility 100 through the distribution line 5. Note that, the step-down transformer 6 may be situated beneath the surface of the ground, or may be housed in a metal casing situated above the surface of the ground, or may be installed in an electric room of a condominium.

The master 3 is situated in a vicinity (e.g., a utility pole) of the step-down transformer 6 for supplying the commercial electricity to the facility 100. The master 3 is configured to transmit the meter-reading data to the upper server 8 owned by an electric power company or a service provider of collecting amounts of energy, through a dedicated line 7 using, for example, an optic fiber. In short, the master 3 obtains the meter-reading data from at least one of the energy meters 1 of the facilities 100, and transmits the obtained meter-reading data to the upper server 8 through the dedicated line 7.

The master 3 includes a lower communication unit 31 configured to communicate with the slave 2, and an upper communication unit 32 configured to communicate with the upper server 8. The master 3 receives the meter-reading data through the lower communication unit 31 and sends the meter-reading data to the upper server 8 through the upper communication unit 32. In this regard, the lower communication unit 31 is connected to the distribution line 5 connected to a secondary side of the step-down transformer 6. The lower communication unit 31 communicates with the first interface unit 21 of the slave 2 through the first communication path 11 defined by the distribution line 5. The upper communication unit 32 is connected to the dedicated line 7. Note that, the master 3 may include a storage unit (not shown) and be configured to temporarily store the meter-reading data obtained from the slave 2 in the storage unit. In a case of a condominium inside which a plurality of step-down transformers 6 are situated, the master 3 may be connected to the secondary sides of the step-down transformers 6. In this case, for example, the master 3 is situated in an electric room or a building manager room in a building.

The upper server 8 is a server computer configured to collect the meter-reading data from the energy meters 1 of the plurality of facilities 100 in a management area. The upper server 8 constitutes the upper device 30 together with the master 3 configured to obtain the meter-reading data from at least one of the energy meters 1 of the facilities 100. In short, the upper device (the master 3 and the upper server 8) 30 performs the power line communication with the first interface unit 21 of the slave 2 through the first communication path 11 defined by the distribution line 5 between the upper device 30 and the slave 2, thereby obtaining the meter-reading data from the slave 2.

Note that, there may be a management server (not shown) interposed between the master 3 and the upper server 8. The management server is installed in accordance with a region. In this case, in each region, the management server collects the meter-reading data from the master 3. The upper server 8 collects the meter-reading data from the plurality of management servers. Consequently, it is possible to efficiently collect the meter-reading data of the facilities 100 in the plurality of regions. When the management server exists, the management server is also included in the upper device 30.

The electric appliances used in the facility 100 include at least one electric appliance 9 having the function of communication with the slave 2. The second interface unit 22 of the slave 2 performs wireless communication with the electric appliance 9 through the second communication path 12. Such an electric appliance 9 can display the measurement result of the energy meter 1 to visually indicate the energy consumption in the facility 100, and can be controlled by signals from the electric power company to suppress the peak of the energy demand (i.e., peak cut).

As shown in FIG. 1, examples of the electric appliance 9 include first appliances 91 and 92, and a second appliance 93. For example, the first appliances 91 and 92 each may be configured to display the measurement result (the meter-reading data) of the energy meter 1. The second appliance 93 may be a HEMS (Home Energy Management System) device connected to various types of loads in the facility 100. Additionally, in the instance shown in FIG. 1, the first appliance 92 communicates with the slave 2 by way of a relay 94. Hence, a combination of the first appliance 92 and the relay 94 constitutes an electric appliance 9. Moreover, the second appliance 93 communicates with the slave 2 by way of a measurement unit 95 situated in a distribution circuit board 90, and therefore a combination of the second appliance 93 and the measurement unit 95 constitutes an electric appliance 9. Note that, the measurement unit 95 alone may be used as an electric appliance 9.

Each of these electric appliances 9 includes a wireless communication unit 901 for implementing the function of communicating with the slave 2. The first appliance 91 uses its wireless communication unit 901 to perform direct wireless communication with the second interface unit 22 of the slave 2. The first appliance 92 uses its wireless communication unit 901 to perform wireless communication with the second interface unit 22 of the slave 2 by way of the wireless communication unit 901 of the relay 94. The measurement unit 95 uses its wireless communication unit 901 to perform direct wireless communication with the second interface unit 22 of the slave 2, and also uses its wireless communication unit 901 to perform wireless communication with the wireless communication unit 901 of the second appliance 93.

Each of the first appliances 91 and 92 may have a function such as a function of displaying information such as the meter-reading data received from the slave 2 on a display (not shown) and a function of displaying such information on a housing information board or a television set in the facility 100. The second appliance 93 has a function of sending information such as power consumption information of loads to the electric power company by way of the slave 2, and of controlling the loads, for example. The measurement unit 95 has a function of measuring an amount of consumed energy for each branch circuit. In response to reception of a signal for peak cut from the slave 2, the measurement unit 95 sends, based on current amounts of consumed energy of the individual branch circuits, a signal for controlling the loads, to the second appliance 93. Consequently, the second appliance 93 can control the loads based on the signal from the electric power company in order to suppress the peak of energy demand (peak cut).

Note that, each of the first appliances 91 and 92 may have a function of communicating with the second appliance 93 to change various settings of the second appliance 93. In this case, a content of control on a load by the second appliance 93 can be determined by use of the first appliances 91 and 92.

The maintenance terminal 4 is carried by a worker of an electric power company. Generally, the maintenance terminal 4 is used for maintenance and inspection of the energy meter 1 and the slave 2. Additionally, in the energy management system 10 of the present embodiment, the maintenance terminal 4 is used in meter-reading operation (so-called, on-site meter-reading) by a worker at a site (i.e., the facility 100). For example, the worker carrying the maintenance terminal 4 operates the maintenance terminal 4 to communicate with the slave 2 at the facility 100, and thus allows the maintenance terminal 4 to read out the measurement result (the meter-reading data) of the energy meter 1.

The maintenance terminal 4 includes a wireless communication unit 41 configured to communicate with the slave 2, a manual interface unit 42 configured to receive a manual input from a person, a display unit 43 configured to display various types of information, and a storage unit 44 configured to store information such as the read out meter-reading data. Consequently, the maintenance terminal 4 performs direct wireless communication with the third interface unit 23 of the slave 2 by use of the wireless communication unit 41 in response to the manual input to the manual interface unit 42. As a result, the maintenance terminal 4 can display the read-out meter-reading data and the like on the display unit 43, and also store the read out meter-reading data in the storage unit 44. Additionally, according to the maintenance terminal 4, it is possible to perform maintenance, inspection, change of various settings of the energy meter 1 and the slave 2, by use of the manual interface unit 42 and the display unit 43.

Note that, the maintenance terminal 4 is used for the purpose of meter-reading, maintenance, and inspection, by the worker of the electric power company at the site (facility 100). Hence, the communication between the maintenance terminal 4 and the slave 2 can be implemented by near field communication for a short distance of several meters. Further, the maintenance terminal 4 identifies the slave 2 by use of information (e.g., a meter number) preliminarily allocated to the energy meter 1 to identify the energy meter 1. In a case where the maintenance terminal 4 tries to communicate with the slave 2 of the desired facility 100, the maintenance terminal 4 does not accidentally communicate with the slave 2 of the adjacent facility 100, for example.

The border of the responsibility between the electric power company and residents of the facility 100 is at the energy meter 1. Accordingly, the electric power company is responsible for managing the master 3, the maintenance terminal 4, the dedicated line 7, the upper server 8, the first communication path 11, and the third communication path 13, and the residents of the facility 100 are responsible for managing the electric appliance 9 and the second communication path 12. The first communication path 11 is included in an information transmission route (so-called, an A-route) between the energy meter 1 and the electrical power company. The second communication path 12 is included in an information transmission route (so-called, a B-route) enabling directly obtaining information from the energy meter 1.

In the slave 2 of the energy management system 10, one of the first interface unit 21 and the second interface unit 22 may perform power line communication through a communication path using the distribution line 5 as a transmission medium, and the other may perform wireless communication through a communication path using an electric wave as a transmission medium. In brief, one of the first interface unit 21 and the second interface unit 22 is a wired communication unit configured to perform power line communication using the distribution line 5, and the other of the first interface unit 21 and the second interface unit 22 is a wireless communication unit configured to perform second wireless communication using an electric wave.

In the present embodiment, the first interface unit 21 performs power line communication with the master 3 through the first communication path 11 using the distribution line (second path 502) on the upstream side of the energy meter 1 as the transmission medium. In other words, the first interface unit 21 is the wired communication unit, and is configured to perform power line communication with the upper device 30 through the second path 502.

The second interface unit 22 performs wireless communication with the electric appliance 9 through the second communication path 12 using an electric wave as the transmission medium. In other words, the second interface unit 22 is the wireless communication unit and is configured to perform the second wireless communication using an electric wave with the electric appliance 9.

As described above, in the slave 2, one (in this embodiment, first) interface unit selected from the first interface unit 21 and the second interface unit 22 performs the power line communication, and the other (in this embodiment, second) interface unit performs the wireless communication. Therefore, the energy management system 10 can avoid interference between communication between the slave 2 and the master 3 and communication between the slave 2 and the electric appliance 9.

In summary, it is not preferable that the traffic of the communication between the slave 2 and the master 3, that is in the A-route and is managed by the electric power company, and the traffic of the communication between the slave 2 and the electric appliance 9, that is in the B-route and is managed by the residents of the facility 100, influence each other. In the energy management system 10 of the present embodiment, one of the communication between the slave 2 and the master 3 and the communication between the slave 2 and the electric appliance 9 is the power line communication and the other is the wireless communication. Hence, the traffic of one communication is separated from the traffic of the other communication, and thus the interference of the communications can be avoided.

Additionally, in the slave 2 of the energy management system 10 of the present embodiment, the second interface unit 22 configured to communicate with the electric appliance 9 and the third interface unit 23 configured to communicate with the maintenance terminal 4 perform wireless communication by use of the same protocol. In the present embodiment, the wireless communication (second wireless communication) by the second interface unit 22 and the wireless communication (first wireless communication) by the third interface unit 23 are performed based on the same protocol. In short, the first wireless communication and the second wireless communication are not necessarily performed based on different protocols.

The protocols for the second interface unit 22 and the third interface unit 23 are made same so that the second interface unit 22 and the third interface unit 23 communicate through the second communication path 12 and the third communication path 13 using electric waves respectively but use the same frequency band and the same modulation scheme. For example, the second interface unit 22 and the third interface unit 23 communicate with the electric appliance 9 and the maintenance terminal 4 with the 920 MHz band for specified low power radio stations, respectively. The second interface unit 22 and the third interface unit 23 are used for communication in the near filed of the facility 100, and the transmission power of each of the second interface unit 22 and the third interface unit 23 is set to 20 mW, for example.

When the protocols (e.g., the frequency bands and the modulation schemes) used in the different communication paths are same and the same channel (e.g., a frequency and a time slot) is used, interference between the different communication paths is likely to occur. In view of this, the second interface unit 22 and the third interface unit 23 use the same protocol, but perform wireless communication by using different channels so that the second communication path 12 and the third communication path 13 are isolated from each other.

It is sufficient that the second interface unit 22 and the third interface unit 23 are configured to perform wireless communication through communication paths using electric waves. Hence, various types of protocols are available in addition to the protocol using the 920 MHz band described above. For example, a desired standard such as Wi-Fi (registered trademark), ZigBee (registered trademark), and Bluetooth (registered trademark) is available for the second interface unit 22 and the third interface unit 23.

As described above, in the slave 2 of the energy management system 10, the second interface unit 22 and the third interface unit 23 use the same protocol, and thus the second interface unit 22 and the third interface unit 23 can be constituted by a single communication module 26.

In summary, the second interface unit 22 and the third interface unit 23 are realized by the single communication module 26. Thus, the slave 2 can communicate with the electric appliance 9 and the maintenance terminal 4 by use of the single communication module 26. Note that, whether the communication module 26 functions as the second interface unit 22 or the third interface unit 23 can be determined by instructions to the communication module 26 from the controller 25, for example.

Figure 2:
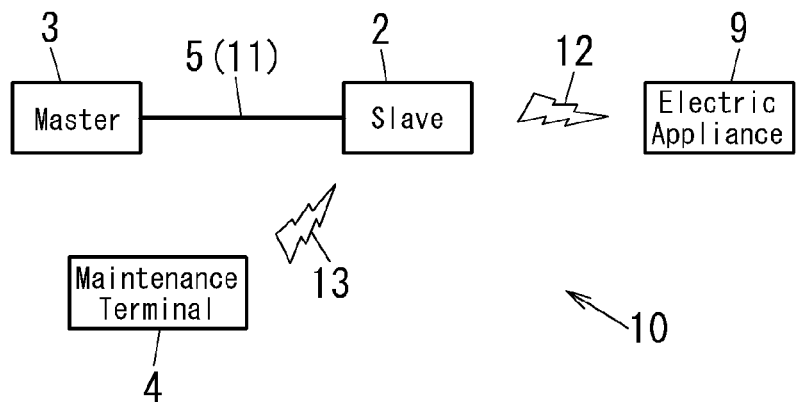
FIG. 2 is a system configuration diagram illustrating an operation of the energy management system in accordance with the first embodiment.

The following explanation referring to FIG. 2 is made to an operation of the energy management system 10 of the present embodiment configured as described above.

The slave 2 obtains the meter-reading data measured at regular intervals (e.g., every 1 minute, every 5 minutes, and every 10 minutes) from the energy meter 1 (see FIG. 1), and stores the obtained meter-reading data for a predetermined time period (e.g., a whole day) in the storage unit (not shown).

The master 3 can communicate with a plurality of slaves 2 connected to the first communication path 11 defined by the distribution line 5. The master 3 communicates with each slave 2 through the first communication path 11 and thus periodically collects the meter-reading data from the plurality of slaves 2 (so-called, routine meter-reading). For example, when the current time becomes a predetermined point of time (e.g., midnight) of a day, the master 3 conducts power line communication with the slave 2 to request the slave 2 to send the meter-reading data, and then receives the meter-reading data from the slave 2 as a reply to such a request, and stores the meter-reading data in the storage unit (not shown). When the master 3 obtains the meter-reading data from all the slaves 2 connected to the distribution line 5, the master 3 aggregates the obtained meter-reading data to form meter-reading information, and sends the meter-reading information to the upper server 8 (see FIG. 1) through the dedicated line 7 (see FIG. 1).

The slave 2 also has a function of sending the stored meter-reading data to the maintenance terminal 4 in response to a request from the maintenance terminal 4. In other words, the maintenance terminal 4 conducts wireless communication with the slave 2 through the third communication path 13 to request the slave 2 to send the meter-reading data, and then obtains the meter-reading data by receiving the meter-reading data from the slave 2 as a reply to such a request (on-site meter-reading). In a case where the routine meter-reading by the master 3 is incomplete, the worker can perform the on-site meter-reading by use of the maintenance terminal 4, and therefore the missing meter-reading data can be obtained.

The maintenance terminal 4 also has a function of communicating with the electric appliance 9. That is, the maintenance terminal 4 communicates with the electric appliance 9 through the third communication path 13, the slave 2, and the second communication path 12. Accordingly, for example, the maintenance terminal 4 can send instruction data such as changing settings for the electric appliance 9 to the slave 2 through the third communication path 13, and instruct the slave 2 to transfer the instruction data to the electric appliance 9 through the second communication path 12. Further, the maintenance terminal 4 can receive reply data from the electric appliance 9 through the slave 2.

Additionally, the slave 2 performs wireless communication with the electric appliance 9 through the second communication path 12 to send the measurement result of the energy meter 1 to the electric appliance 9 so that the electric appliance 9 can display an amount of energy used in facility 100, for example. Further, for the purpose of suppressing the peak of energy demand (peak cut), the slave 2 sends a signal sent from the electric power company via the master 3, to the electric appliance 9 through the second communication path 12 so that the operation of the load can be controlled.

The master 3 can collect information of the electric appliance 9 that is obtained by the slave 2 from the electric appliance 9 through the second communication path 12, by sending a request for the information of the electric appliance 9 in the facility 100 to the slave 2 through the first communication path 11. Further, the maintenance terminal 4 can send the meter-reading data obtained by the on-site meter-reading to the slave 2 through the third communication path 13 and make the slave 2 transfer this meter-reading data to the master 3 through the first communication path 11.

Additionally, the maintenance terminal 4 may have a function of sending, to the slave 2, requests for changing communication settings (e.g., frequency bands, modulation schemes, communication levels such as transmission power and receiving sensitivity) used by the second interface unit 22 and the third interface unit 23. In this instance, the worker can change the communication settings of the second interface unit 22 and the third interface unit 23 depending on a condition of communication between the slave 2 in the facility 100 and the electric appliance 9 and a condition of communication between the slave 2 in the facility 100 and the maintenance terminal 4.

According to the configuration of the present embodiment described above, the slave 2 attached to the energy meter 1 can communicate with the electric appliance 9 used in the facility 100 in addition to the master 3 and the maintenance terminal. Consequently, the electric appliance 9 is allowed to visually indicate the energy consumption of the facility 100 by displaying the measurement result of the energy meter, for example. Further, the electric appliance 9 can be controlled according to signals from the electric power company for the purpose of suppressing the peak of the energy demand (i.e., peak cut).

In the present embodiment, with regard to the slave 2, one of the first interface unit 21 and the second interface unit 22 performs the power line communication through the communication path using the distribution line 5 as the transmission medium, and the other performs the wireless communication through the communication path using the electric wave as the transmission medium. In summary, the power line communication is used for the communication between the slave 2 and the master 3, and the wireless communication is used for each of the communication between the slave 2 and the maintenance terminal 4 and the communication between the slave 2 and the electric appliance 9. Hence, traffic of the communication between the slave 2 and the master 3 can be isolated from traffic of the other communication. As a result, the slave 2 of the energy management system 10 of the present embodiment can communicate with the electric appliance 9 used in the facility 100 in addition to the upper device (master 3) 30, yet it is possible to avoid interference between the communication between the slave 2 and the upper device (master 3) 30 and the communication between the slave 2 and the electric appliance 9.

Moreover, in the present embodiment, with regard to the slave 2, the second interface unit 22 and the third interface unit 23 uses the same protocol, and therefore the single communication module 26 can function as both the second interface unit 22 and the third interface unit 23. Hence, in contrast to a configuration in which the slave 2 includes three or more communication interfaces to have a function of communicating with the electric appliance 9 in addition to functions of communicating with the master 3 and the maintenance terminal 4, the slave 2 of the present embodiment can be downsized and be produced at a lowered cost. In other words, increases in size and cost of the slave 2 of the energy management system 10 of the present embodiment is avoided as possible, and nevertheless there is an advantage that the slave 2 can communicate with the electric appliance 9 used in the facility 100 in addition to the upper device (master 3) 30.

Furthermore, the slave 2 is attached to the energy meter 1 and thus the energy management system 10 as described above can be constructed by adding or replacing the slave 2 without replacing the energy meter 1. In addition, a function added to the energy meter 1 can be changed by replacing only the slave 2, and therefore there is an advantage that the energy management system 10 has relatively high expandability.

Note that, in the following explanation for the present embodiment, the phrase "interface unit" is expressed as "I/F" if necessary.

In the energy management system 10 described above, in order to allow the upper device 30 to identify one or more slaves 2, it is necessary that identification information is allocated to individual slaves 2. For example, such identification information is selected from an address used by the slave 2 to communicate with the upper device 30, a product number uniquely given to the slave 2, and a MAC address given to the slave 2 with a communication function, for example. It is sufficient that the identification information is uniquely allocated to the slave 2 managed by the upper device 30. In summary, it is sufficient that the identification information is unique with regard to the slaves 2 managed by the master 3. As shown in FIG. 3, the controller 25 of the slave 2 includes an identification information holding unit 251 for holding the identification information. In other words, the controller 25 includes the identification information holding unit 251 storing the identification information unique to the slave 2. For example, the controller 25 is configured to, when receiving the identification information from the upper device 30, store the received identification information in the identification information holding unit 251. Note that, the meter I/F 24 is not shown in FIG. 3.

The following explanation is made to an example in which the master 3 issues an address for communication allocated to the slave 2 managed by the master 3 and this address is used as the identification information. Accordingly, the address used by the slave 2 to communicate (communicate through the A-route) with the upper device 30 is issued by the master 3. In this example, the master 3 issues the address in response to reception of an address request from the slave 2, and sends the issued address to the slave 2 that has sent the address request. Additionally, the master 3 issues the addresses for the slaves 2 in an order of reception of the address request. The address is an integer indicative of a number of issuance.

Figures 4, 5:
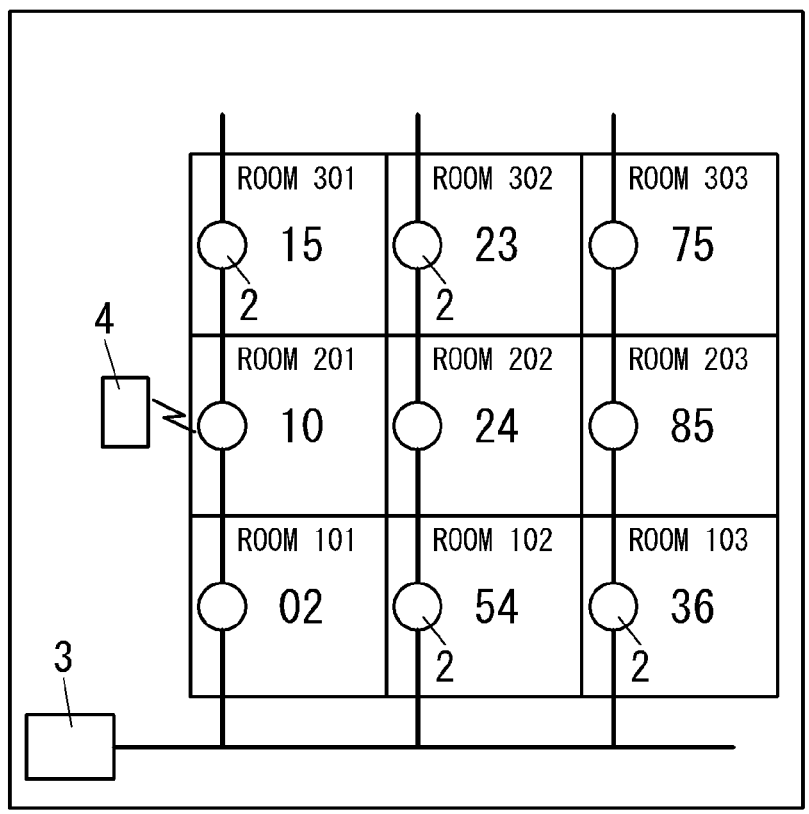
FIG. 4 is a schematic configuration diagram illustrating a usage example of the slave in accordance with the first embodiment.
FIG. 5 is a diagram illustrating an example of a setting of initial channels relating to an example shown in FIG. 4.

FIG. 4 shows an example in which the slaves 2 are individually situated in dwelling units (facilities 100) of a condominium, and numbers placed on right sides of the slaves 2 represent the addresses issued by the master 3. Squares illustrated in FIG. 4 schematically represent the dwelling units, and labels "room --" represent dwelling unit number. In this example, the single master 3 is installed in the condominium, and collects the meter-reading data from the slaves 2 individually installed in the dwelling units of the condominium.

As described above, the master 3 allocates the addresses to the slaves 2 in the order of reception of the address requests. As illustrated in FIG. 4, there is no relation between a physical location of the dwelling unit represented by the dwelling unit number and the address of the slave 2. As described above, if no relation between the address and the dwelling unit number is required, a procedure of allocating the addresses to the slaves 2 is facilitated and thus it can be easy to install the system.

In this regard, a communication area of the slave 2 must be limited so that the slave 2 is allowed to communicate with the electric appliance 9 in the facility associated with the slave 2 and is not allowed to communicate with the electric appliance 9 in a neighboring facility. Further, an area in which the slave 2 and the maintenance terminal 4 communicate with each other must be limited so that, in a period in which the slave 2 communicates with the maintenance terminal 4, the maintenance terminal 4 is not allowed to communicate with another slave 2. Well known techniques of limiting communication areas may include a technique of selecting channels used in communication areas, a technique of adjusting either the output power (transmission power) at the transmission side or the reception sensitivity at the reception side, and a technique of distributing encryption keys used in communication areas.

The limitation of the communication area may be required for not only a case in which the second I/F 22 and the third I/F 23 use electric waves as the transmission media but also the power line communication using the distribution line 5 as the transmission medium. In the following, the technique of selecting channels is described, and after that the technique of adjusting either the output power or the reception sensitivity is described.

The slave 2 selects channels used in the second I/F 22 and the third I/F 23 from a plurality of channels in a predetermined selectable range. Note that, normally, the third I/F 23 is not used. In view of this, it is preferable that the third I/Fs 23 of all the slaves 2 use the same channel and this channel be used by the second I/F 22 while the third I/F 23 is not used.

The channel is defined by at least one of a frequency and a time slot. With regard to the slave 2, channels to be used by the second I/F 22 and the third I/F 23 of the slave 2 are defined by parameters in the selectable range selected from various types of frequencies, various types of time slots, or combinations of various types of frequencies and various types of time slots. Note that, the channel may be defined by a frequency, a time slot, or a combination of a frequency and a time slot.

In the slave 2, the controller 25 includes a channel selector 252 configured to select a channel used by the slave 2 from the plurality of channels in the predetermined selectable range.

In summary, as shown in FIG. 3, the controller 25 of the slave 2 includes the channel selector 252 configured to select a communication channel (first communication channel) to be used for wireless communication (wireless communication by the third interface unit 23) from the plurality of channels. Additionally, the channel selector 252 is configured to designate a communication channel (second communication channel) to be used for the second wireless communication (wireless communication by the second interface unit 22). In the present embodiment, the channel selector 252 selects the same channel, as the first communication channel and the second communication channel.

Integers more than 0 associated with the parameters in the aforementioned selectable range are used as the channels in the present embodiment. There is no intent to limit the format for representing the channels. However, using integers allows easy designation of the channels.

Before fixing the channel to be used, the slave 2 performs a prior process of tentatively setting the channel, and performs a subsequent process of, after evaluating interference in a case where the communication is performed by use of the channel set in the prior process, changing the channel based on the evaluation result if necessary. In summary, the slave 2 performs two processes including the prior process and the subsequent process. In the prior process, the channel (hereinafter referred to as "initial channel") is tentatively set, and in the subsequent process, the initial channel is changed appropriately to avoid occurrence of interference.

As shown in FIG. 3, the slave 2 includes, in the controller 25, an interference evaluator 253 configured to evaluate a degree of interference in a case where the initial channel tentatively set is used, and a change instructor 254 configured to instruct the channel selector 252 to change the channel when there is a possibility of interference. In short, as shown in FIG. 3, the controller 25 of the slave 2 includes the interference evaluator 253 and the change instructor 254.

The interference evaluator 253 is configured to judge whether interference of electric waves occurs in the communication channel. For example, the interference evaluator 253 calculates an evaluation value representing a degree of interference, and evaluates the degree of interference through comparison of the evaluation value with a prescribed threshold.

For the evaluation value for evaluating the degree of interference, a received signal strength indication (RSSI), the frequency, the time slot, or an appropriate combination of these can be used, for example. When the received signal strength indication is high, interference is likely to occur. Additionally, when a difference between the frequencies is small or when the time slots are adjacent to each other, interference also is likely to occur. Hence, by converting such information into numerical values as the evaluation values, indications for evaluating the degree of interference can be obtained.

It is assumed that the evaluation value is determined so as to be monotonically increased with a change in the degree of interference. In this case, the interference evaluator 253 compares the evaluation value with the threshold. When the evaluation value exceeds the threshold, the interference evaluator 253 determines that the degree of interference is high and there is need to change the channel.

The change instructor 254 is configured to provide the change instruction to the channel selector 252 when the interference evaluator 253 determines that the interference occurs. For example, when the interference evaluator 253 determines that the change of the channel is necessary (i.e., the evaluation value exceeds the threshold), the change instructor 254 instructs the channel selector 252 to change the selected channel. Additionally, the change instructor 254 is configured to not provide the change instruction to the channel selector 252 when the interference evaluator 253 determines that the interference does not occur. For example, when the evaluation value is less than the threshold in the interference evaluator 253, the change instructor 254 uses the channel selected by the channel selector 252 for communication.

The channel selector 252 is configured to change the communication channel in response to reception of the change instruction from the change instructor 254.

In particular, the channel selector 252 is configured to select from the plurality of channels the initial channel as a candidate for the communication channel, depending on the identification information stored in the identification information holding unit 251. The channel selector 252 is configured to, when receiving the change instruction from the change instructor 254, select from the plurality of channels a channel different from the initial channel, and set the selected channel as the communication channel. The channel selector 252 is configured to, when not receiving the change instruction from the change instructor 254, set the initial channel as the communication channel.

In the following, a concrete example of the operation of the slave 2 is described using the case shown in FIG. 4. This example of the operation is only an example, and there is no intent to limit the operation of the slave 2, and therefore the slave 2 may perform other alternative operation.

The illustrated instance shows a condition in which the master 3 issues the identification information for the slave 2 in response to the address request from the slave 2. The slave 2 holds the identification information issued by the master 3 in the identification information holding unit 251. In this operation example, the channel selector 252 selects as the initial channel the channel corresponding to the least significant digit of an integer of two digits held in the identification information holding unit 251. In the illustrated instance, the identification information (address) issued under management of the master 3 is of two digits such as "02", "54", . . . , "15", and "23". The master 3 issues the identification information so as not to be same as the identification information that has already been issued, and therefore the same identification information is not issued under the management area of the master 3.

The channel selector 252 of the slave 2 uses the channel corresponding to the least significant digit of the identification information as the initial channel, and therefore the channel corresponding to a number of one digit, that is, "0" to "9" is set to the initial channel as shown in FIG. 5. In the case of the instance illustrated in FIG. 4, the same initial channel "04" is given to the room 102 and the room 202 adjacent in the vertical direction, and the same initial channel "05" is given to the room 203 and the room 303 adjacent in the vertical direction.

Note that, the initial channel is selected by use of the least significant digit of the identification information defined by an integer, but may be selected by use of another rule. For example, the initial channel may be selected by use of a remainder of division of the identification information defined by an integer by an appropriate divider. When the initial channel is selected based on the least significant digit, the number of selectable channels is 10. Whereas, when the initial channel is selected based on the remainder, the number of selectable channels depends on the value of the divider.

As described, there is no relation between the position of the dwelling unit (facility 100) and the identification information of the slave 2. Therefore, when the channel is selected based on the least significant digit of the identification information, the same channel is set to the slaves 2 installed in the neighboring dwelling units in some cases. Hence, there is a possibility that the same initial channel is set to the adjacent slaves 2. When the slaves 2 using the same initial channel are installed adjacent to each other, interference is likely to occur in communication.

The slave 2 measures the received signal strength indications of all the channels in the selectable range in order to detect the initial channel set to another slave 2 existing in an area in which the slave 2 can communicate. And, the slave 2 records as "in-use channel" a channel corresponding to the received signal strength indication greater than a prescribed threshold. The process of detecting the in-use channel is performed by the interference evaluator 253. To detect the in-use channel, it is necessary to measure the received signal strength indication for each channel. Hence, the interference evaluator 253 sequentially in turn measures the received signal strength indications of all the channels in the selectable range.

When the in-use channel is same as the channel to be used, interference is likely to occur. Hence, the interference evaluator 253 of the slave 2 tries to detect another slave 2 which uses a channel that is one of the detected in-use channels and is same as the initial channel of the slave 2. In a process of measuring the received signal strength indications of the individual channels, the slave 2 receives the identification information as well as the channel of another slave 2. For example, the interference evaluator 253 of the slave 2 receives packets outputted from the other slaves 2 to evaluate the received signal strength indications, and extracts the identification information of another slave 2 from the header of the received packet. Consequently, the slave 2 obtains the identification information of another slave 2 that has the same initial channel as the slave 2 and gives the received signal strength indication greater than the threshold.

In the example described herein, the identification information of the slave 2 is an integer. When the same initial channel is set to the two or more slaves 2, the interference evaluator 253 selects one slave 2 that is allowed to use this initial channel from the two or more slaves 2 based on whether the identification information is greater. When two or more other slaves 2 have the same initial channel and give the received signal strength indications greater than the threshold, the interference evaluator 253 determines whether the identification information is greater than the other identification information. When the identification information of the slave 2 is the smallest of the pieces of the identification information of the other slaves 2, the interference evaluator 253 of the slave 2 allows the slave 2 to continue to use this initial channel as the communication channel. Further, the interference evaluator 253 of the slave 2 requests the channel selector 252 to change the channel by use of the change instructor 254 when the identification information of the slave 2 is not the smallest of the pieces of the identification information of the other slaves 2.

When the interference evaluator 253 intends to request the change instructor 254 to change the channel, first the interference evaluator 253 tries to detect the channel corresponding to the received signal strength indication equal to or less than the threshold from the channels in the selectable range. When the received signal strength indication of the channel is equal to or less than the threshold, it can be considered that the channel is not used or interference is unlikely to occur even when the channel is used. Hence, the detected channel is treated as "available channel". When the available channel is detected, the interference evaluator 253 provides information of the available channel to the change instructor 254. In summary, the interference evaluator 253 is configured to judge whether the plurality of channels includes at least one available channel that does not cause interference of the electric wave. The interference evaluator 253 is configured to, when determining that the plurality of channels includes the available channel, provide available channel information identifying the at least one available channel to the change instructor 254. Note that, in some cases, there is a plurality of available channels. In such cases, the available channel information individually identifies the plurality of available channels.

The change instructor 254 is configured to select a designated available channel to be set as the communication channel from the at least one available channel identified by the available channel information, and provide the change instruction indicating the designated available channel to the channel selector 252. For example, the change instructor 254 instructs the channel selector 252 to change the channel after a lapse of a waiting time period determined based on the initial channel. The waiting time period is determined so that the waiting time period is shorter as the number of the initial channel is smaller (e.g., the waiting time period is given by multiplying a unit time period by the number of the initial channel). When the waiting time period is determined in such a manner, it is possible to avoid an undesired situation in which the slaves 2 selecting the different initial channels select the same available channel.

The channel selector 252 is configured to, when receiving the change instruction from the change instructor 254, set the designated available channel indicated by the change instruction as the communication channel.

Figure 6:
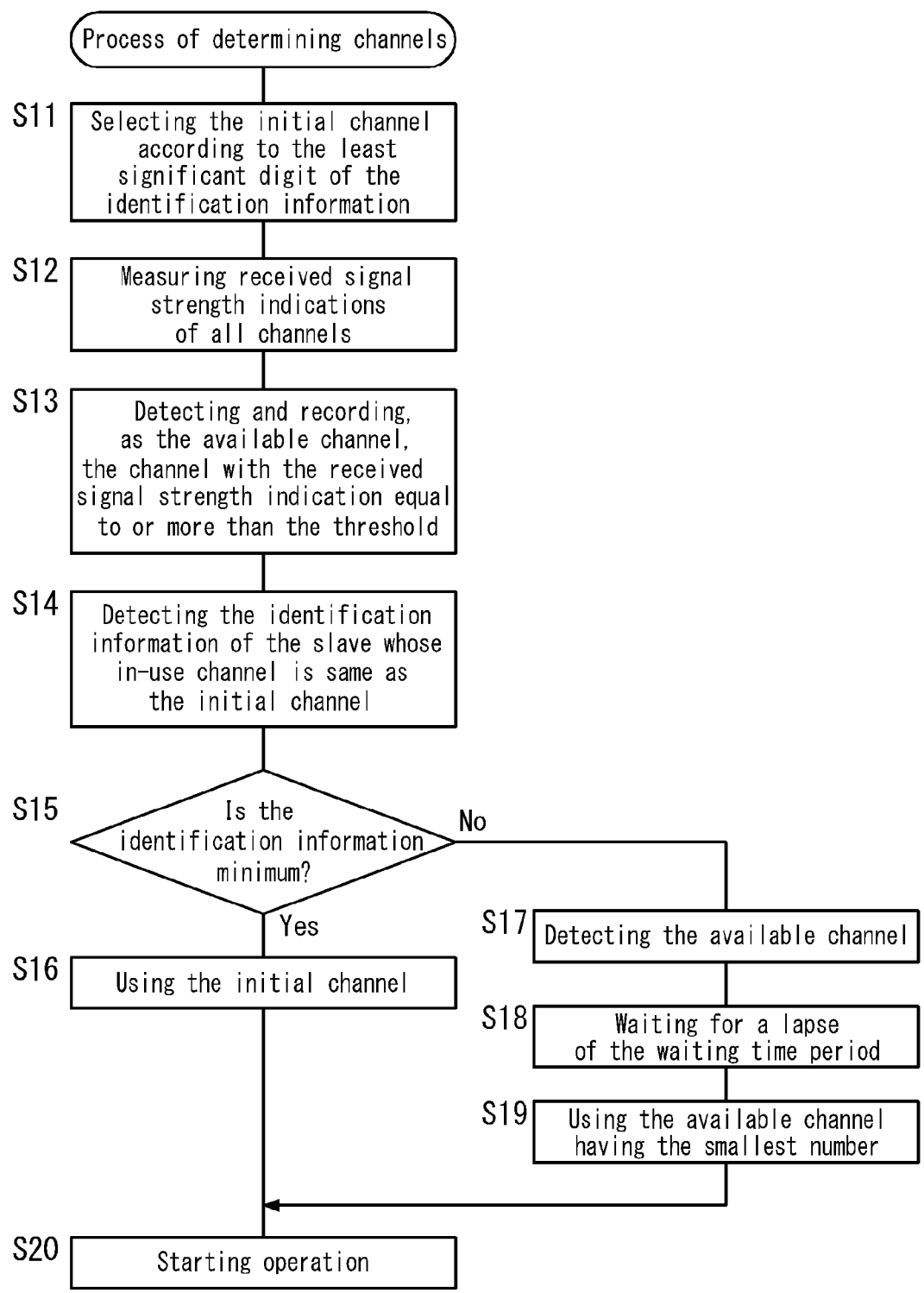
FIG. 6 is an explanatory diagram illustrating an operation in a channel setting procedure in the slave in accordance with the first embodiment.

The aforementioned channel selection techniques are collectively illustrated in FIG. 6. In preprocessing, the channel selector 252 of the slave 2 in question selects the initial channel corresponding to the least significant digit of the identification information of the slave 2 in question defined by an integer (S11). Thereafter, the interference evaluator 253 of the slave 2 in question measures the received signal strength indications of all the channels in the selectable range sequentially in turn (S12), detects the channel whose received signal strength indication is greater than the threshold, as the in-use channel, and records the detected channel (S13). Next, the interference evaluator 253 of the slave 2 in question obtains, from the header of the packet, the identification information of another slave 2 whose in-use channel is same as the initial channel of the slave 2 in question (S14). When another slave 2 whose in-use channel is same as the initial channel of the slave 2 in question is present and interference is likely to be caused by the presence of this slave 2, whether the identification information of this slave 2 is greater than the identification information of the slave 2 in question is determined (S15).

When the identification information of the slave 2 is minimum (S15: Yes), use of the initial channel is continued (S16). In contrast, when the identification information of the slave 2 is not minimum (S15: No), the interference evaluator 253 evaluates the received signal strength indications for all the channels to detect the available channel (S17). When the available channels are detected, after a lapse of the predetermined waiting time period (S18), the change instructor 254 instructs the channel selector 252 to select, as the channel to be used by the second I/F 22, the available channel corresponding to the smallest one of the numbers of the detected available channels (S19). Through the aforementioned manner, the channel to be used by the second I/F 22 is selected by the channel selector 252, and consequently the slave 2 starts to operate by use of the selected channel (S20).

Even when the same initial channel is set to two or more slaves 2, the fact that the same initial channel is set cannot be detected, provided that the header of the packet outputted from any of these slaves 2 cannot be received by another slave 2. When physical distances between the slaves 2 are relatively long, or there may be partitions between the slaves 2, the received signal strength indication may be so low that the slaves 2 cannot recognize the header of the packet from the others. In this case, the comparison of the identification information of the slave 2 is not performed even when interference is likely to occur.

In other words, even when the same initial channel is set to two or more slaves 2, provided that the slave 2 can communicate with the electric appliance 9 in the facility associated with the slave 2 and the maintenance terminal 4 but cannot communicate with the other slaves 2, the slave 2 can use the initial channel without change.

In view of this, the controller 25 of the slave 2 includes a communication quality evaluator 255 configured to evaluate a communication quality through test communication, and a power instructor 256 configured to adjust the output power of the second I/F 22 and the output power of the third I/F 23.

The communication quality evaluator 255 is configured to evaluate a communication quality of the communication channel (first communication channel) selected by the channel selector 252. For example, the communication quality evaluator 255 is configured to conduct test communication by use of the communication channel (first communication channel) selected by the channel selector 252 to evaluate the communication quality (communication quality of the first communication channel) of the communication path 13 between the slave 2 and the communication terminal 4.

The power instructor 256 is configured to set an intensity of an electric wave allocated to the communication channel (first communication channel) to a lower limit of a range of intensities allowing the communication quality evaluated by the communication quality evaluator 255 to satisfy a predetermined condition. For example, the power instructor 256 is configured to decrease the intensity of the electric wave (electric wave according to the communication channel) outputted from the third interface unit 23 within a range in which the communication quality (communication quality of the communication path 13) evaluated by the communication quality evaluator 255 fulfills the predetermined condition.

In the present embodiment, the communication quality evaluator 255 functions as a second communication quality evaluator. The second communication quality evaluator (the communication quality evaluator) 255 is configured to evaluate a communication quality of the second communication channel selected by the channel selector 252. For example, the second communication quality evaluator 255 is configured to conduct test communication by use of the communication channel (second communication channel) selected by the channel selector 252 to evaluate the communication quality (communication quality of the second communication channel) of the communication path 12 between the slave 2 and the electric appliance 9.

In the present embodiment, the power instructor 256 functions as a second power instructor. The second power instructor (the power instructor) 256 is configured to set an intensity of an electric wave allocated to the second communication channel to a lower limit of a range of intensities allowing the communication quality evaluated by the communication quality evaluator 255 to satisfy a predetermined condition. For example, the second power instructor 256 is configured to decrease the intensity of the electric wave (electric wave according to the communication channel) outputted from the second interface unit 22 within a range in which the communication quality (communication quality of the communication path 12) evaluated by the communication quality evaluator 255 fulfills the predetermined condition.

After the slave 2 obtains the address for communication issued by the master 3 and the initial channel is set, the slave 2 first performs test communication with the electric appliance 9 in the facility managed by the slave 2 and test communication with the maintenance terminal 4. Note that, in a process of setting the initial channel to the slave 2, it is assumed that a person who installs the slave 2 carries the maintenance terminal 4 and thus the maintenance terminal 4 is present in the communication area of the slave 2.

The slave 2 conducting the test communication decreases the output power for transmitting packets with time, and controls the communication quality evaluator 255 to obtain communication statistic information (communication quality) such as a communication error rate and a retransmission rate with regard to at least one of the second I/F 22 and the third I/F 23. Additionally, this slave 2 controls the power instructor 256 to decrease the output power of at least one of the second I/F 22 and the third I/F 23 down to an allowable lower limit of the range in which the communication qualities with the electric appliance 9 and the maintenance terminal 4 are kept good.

As described above, the output power of the slave 2 is decreased down to the allowable lower limit, and thus interference can be avoided even when the same initial channel is set to a plurality of slaves 2. Moreover, the slave 1 decreases the output power down to the allowable limit within the range in which the communication quality is kept good, and therefore the communication quality with the electric appliance 9 in the facility associated with the slave and the communication quality with the maintenance terminal 4 can be maintained.

As a result, a probability that the slave 1 changes the initial channel is reduced, although the number of selectable channels is limited, the channels can be set so as to avoid interference even when the number of slaves 2 is greater than the number of channels.

To enable communication between the slave 2 and the electric appliance 9 in the same facility associated with the slave 2, association (channel setting) between the slave 2 and the electric appliance 9 is necessary. The electric appliance 9 includes two operation modes of a registration mode in which the channel is set to associate the electric appliance 9 with the slave 2, and a normal mode in which the electric appliance 9 operates by use of the set channel. For example, in the registration mode, the electric appliance 9 selects all the channels sequentially in turn until the electric appliance 9 receives the packet sent periodically from the slave 2.

In one example, the packet sent from the slave 2 includes information for identifying the energy meter 1 (e.g., a meter number), and a worker inputs the information for identifying the energy meter 1 into the electric appliance 9. In this example, the electric appliance 9 compares the information for identifying the energy meter 1 to select the channel of the slave 2 of the facility in which the electric appliance 9 is installed. Hence, the association between the slave 2 and the electric appliance 9 can be completed successfully.

In the registration mode, the electric appliance 9 receives packets of all the channels, and therefore the electric appliance 9 may receive the packet from the slave 2 in another facility. However, use of the information for identifying the energy meter 1 can prevent association of the electric appliance 9 with the slave 2 in another facility. When the selection of the channel ends, the electric appliance 9 starts the normal mode and begins to communicate with the slave 2 by use of the selected channel.

In contrast, for example, the maintenance terminal 4 is used by the worker (meter reader) of the electric power company who visits for meter-reading. In this time, the maintenance terminal 4 communicates with the slave 2 to obtain the meter-reading data including an integral value of energy, and the like. Therefore, the channel setting between the slave 2 and the maintenance terminal 4 is necessary in addition to the channel setting between the slave 2 and the electric appliance 9.

The channel used by the maintenance terminal 4 is fixed. Hence, if the slave 2 is prohibited to use the channel allocated to the maintenance terminal 4, the selectable range of channels for the slave 2 is narrowed. In view of an efficiency of use of the channels, it is not preferable that the number of selectable channels be limited and nevertheless one channel be exclusively allocated to the maintenance terminal 4 that is not used frequently.

For this reason, the slave 2 of the present embodiment is configured to use the channel allocated to the maintenance terminal 4 for communication between the second I/F 22 and the electric appliance 9 in a time period in which the third I/F 23 does not communicate with the maintenance terminal 4. When acknowledging the start of use of the maintenance terminal 4, the slave 2 that selects the channel to be used by the maintenance terminal 4 allows the maintenance terminal 4 to use the channel, selects another channel, and uses the selected channel.

The start of use of the maintenance terminal 4 can be acknowledged by receiving an electric wave sent from the maintenance terminal 4 when the worker of the electric power company starts to operate the maintenance terminal 4 in a vicinity of the slave 2. The maintenance terminal 4 is used in the vicinity of the slave 2, and thus the slave 2 can receive an electric wave having a relatively high electrical field intensity. Hence, the slave 2 can acknowledge the start of use of the maintenance terminal 4 by evaluating the electric field intensity of the electric wave received by the third I/F 23. The maintenance terminal 4 may send a packet for an entry request to the slave 2 at the start of use so that the slave 2 receives the address of the maintenance terminal 4 included in the header of this packet.

As for the slave 2 that selects the channel to be used by the maintenance terminal 4, when the third I/F 23 acknowledges the start of use of the maintenance terminal 4, the change instructor 254 instructs the channel selector 252 to select all the channels sequentially in turn.

In the present embodiment, the third interface unit 23 is configured to judge whether use of the communication terminal (maintenance terminal) 4 is started. The change instructor 254 is configured to, when the third interface unit 23 determines that use of the communication terminal 4 is started, provide the change instruction that indicates, as the second communication channel, a channel that does not cause interference with a channel used by the communication terminal 4. The channel selector 252 is configured to, when receiving the change instruction from the change instructor 254, change the second communication channel to the channel indicated by the change instructor 254.

Additionally, the interference evaluator 253 monitors the received signal strength indications of the individual channels in a period in which the change instructor 254 selects the channels sequentially in turn. The slave 2 detects the channel giving the received signal strength indication equal to or less than the threshold (reference value) as the available channel, and assigns the available channel as the channel used by the second I/F 22.

Figures 7, 8, 9:
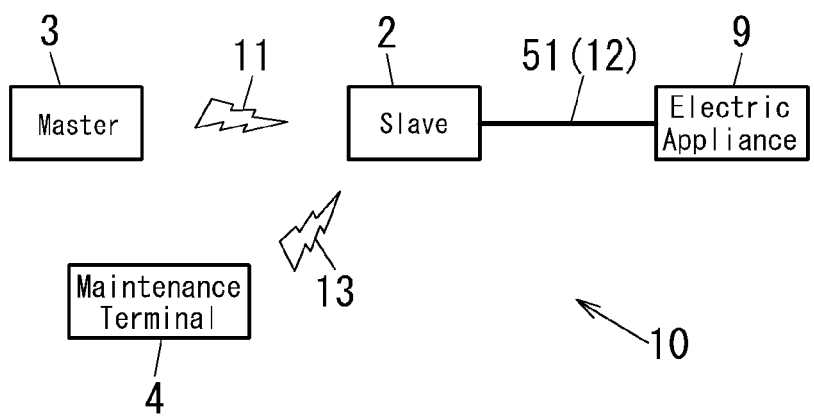
FIG. 7 is a diagram illustrating an example of a setting of channels relating to the example shown in FIG. 4.
FIG. 8 is a diagram illustrating an example of the setting of channels relating to the example shown in FIG. 4.
FIG. 9 is a system configuration diagram illustrating an operation of the energy management system of the second embodiment.

For example, it is assumed that the maintenance terminal 4 uses the channel "0". In this example, as shown in FIG. 7, when the identification information of the slave 2 of the room 201 is "10", the least significant digit of this identification information is "0". When the channel is selected in accordance with the aforementioned rule, the channel used by the second I/F 22 of the slave 2 is also the channel designated by "0". As a result, the slave 2 of the room 201 uses the channel same as the channel used by the maintenance terminal 4, for communication with the electric appliance 9.

In the allocation instance shown in FIG. 4, the channel "1" is not used by any slave 2, and it is assumed that the received signal strength indications of the channels used in the rooms 103, 203, and 303 at the slave 2 of the room 201 are too low to cause interference. When the channels are allocated to the individual slaves 2 as shown in FIG. 7, the available channels detected by the slave 2 of the room 201 are the four channels "1", "6", "8", and "9".

When the third I/F 23 of the slave 2 of the room 201 acknowledges the start of use of the maintenance terminal 4, the change instructor 254 of this slave 2 assigns a right of using the channel "0" currently assigned to the second I/F 22 to the maintenance terminal 4, and searches the available channels for the channel for communication with the electric appliance 9.

The available channels of the slave 2 are the four channels "1", "6", "8", and "9". In the case of using the rule that the channel with the smallest number of the numbers of the available channels is selected, the slave 2 selects the channel "1" as the channel (second communication channel) for communication with the electric appliance 9 as shown in FIG. 8. The rule for the slave 2 to select the channel may be appropriately determined, and for example the slave 2 can select another available channel.

The slave 2 changes the channel for communication with the electric appliance 9, and hence the slave 2 sends a preliminary notice to the electric appliance 9 before changing the channel, to instruct the electric appliance 9 to also change the channel. Note that, the association between the electric appliance 9 and the slave 2 is necessary. For this reason, the information for identifying the energy meter 1 is included in the packet sent from the slave 2 to the electric appliance 9 to give an instruction of change of the channel, and thus the electric appliance 9 can confirm that the slave 2 is a communication partner.

The slave 2 selects the pre-change channel as the channel to be used, after a lapse of a prescribed time period from the end of communication with the maintenance terminal 4. Further, before selecting the pre-change channel, the slave 2 provides a preliminary notice regarding the change of the channel to the electric appliance 9. As described above, the slave 2 that normally uses the same channel as the maintenance terminal 4 changes temporarily the normally used channel to communicate with the maintenance terminal 4. The process allows the slave 2 to normally use the channel same as the channel used by the maintenance terminal 4, and thus the efficiency of use of channels of the slave 2 can be improved.

Moreover, it is desirable that the slave 2 instruct the electric appliance 9 in the facility associated with the slave 2 and the maintenance terminal 4 carried by the person who installs the slave 2, to perform test communication similar to the test communication performed by the slave 2. While the electric appliance 9 and the maintenance terminal 4 perform the test communication, the communication quality evaluator 255 of the slave 2 giving the instruction of the test communication monitors the received signal strength indications relating to the electric appliance 9 and the maintenance terminal 4, and obtains the communication qualities from the electric appliance 9 and the maintenance terminal 4. For example, the communication quality is communication statistic information such as a communication error rate and a retransmission rate.

The communication quality evaluator 255 of the slave 2 makes evaluation by comparing at least one of the received signal strength indication and the communication quality with a threshold, and accordingly instructs the electric appliance 9 and the maintenance terminal 4 to reduce the output power to the allowable lower limit. In this manner, when the slave 2 sets the channel, the output power (transmission power) of each of the electric appliance 9 and the maintenance terminal 4 is reduced to an allowable lower limit. Therefore, the possibility that the electric appliance 9 in one facility and the maintenance terminal 4 are associated with the slave 2 of another facility is reduced. Consequently, it is possible to avoid occurrence of interference of the electric appliance 9 of one facility and the maintenance terminal 4 with the slave 2 of another facility.

As described above, the slave 2 of the energy management system 10 of the present embodiment is a slave of an energy management system, which is attached to the energy meter 1 for measuring the energy consumed in the facility 100 and has a function of transmitting to the upper device 30 the meter-reading data including an amount of the energy measured by the energy meter 1. The slave 2 includes the first interface unit 21, the second interface unit 22, and the third interface unit 23. The first interface unit 21 is configured to communicate with the upper device 30 through the first communication path 11. The second interface unit 22 is configured to communicate with the electric appliance 9, that is one of electric appliances used in the facility 100 and has the communication function, through the second communication path 12. The third interface unit 23 is configured to perform wireless communication with the maintenance terminal 4 having at least a function of obtaining the meter-reading data through the third communication path 13 using the electric wave as the transmission medium. An interface unit that is one of the first interface unit 21 and the second interface unit 22 performs the power line communication through the communication path using the distribution line 5 as the transmission medium, and a further interface unit that is the other of the first interface unit 21 and the second interface unit 22 performs the wireless communication through the communication path using the electric wave as the transmission path.

Further, in the slave 2 of the energy management system 10 of the present embodiment, the interface unit is the first interface unit 21 and is configured to perform the power line communication with the upper device 30 through the first communication path 11 using the distribution line 5 on the upstream side of the energy meter 1 as the transmission medium. Especially, the first communication path 11 is the distribution line (second path) 502 connected to the secondary side of the transformer 6 for sending commercial power to the facility 100.

Moreover, with regard to the slave 2 of the energy management system 10 of the present embodiment, the upper device 30 includes the upper server 8 and the master 3. The upper server 8 is a server computer configured to collect the meter-reading data from the energy meters 1 of the plurality of facilities 100 in a management area. The master 3 has the communication function with the upper server 8 and is configured to send to the upper server 8 the meter-reading data obtained from at least one of the energy meters 1 of the facilities 100.

Furthermore, with regard to the slave 2 of the energy management system 10 of the present embodiment, the maintenance terminal 4 has the communication function with the electric appliance 9.

Additionally, the slave 2 of the energy management system 10 of the present embodiment further includes the channel selector 252, the interference evaluator 253, and the change instructor 254. The channel selector 252 is configured to select the communication channels used by the second interface unit 22 and the third interface unit 23 from channels in the predetermined selectable range. The interference evaluator 253 is configured to evaluate the degree of interference through comparison of the prescribed threshold with the evaluation value indicative of the degree of interference in a case where the channel selected by the channel selector 252 is used. The change instructor 254 is configured to instruct the channel selector 252 to change the channel when the evaluation value is in a range, defined by the threshold, in which the degree of interference is relatively high.

Moreover, the slave 2 of the energy management system 10 of the present embodiment further includes the identification information holding unit 251. The identification information holding unit 251 is configured to hold the identification information that is unique within the management area of the upper device 30. The channel selector 252 is configured to specify the channel based on the identification information held in the identification information holding unit 251 by use of the predetermined rule, and select the specified channel as the initial channel. The identification information holding unit 251 is configured to select the channel different from the initial channel as the communication channel when receiving the change instruction from the change instructor 254, and to select the channel same as the initial channel as the communication channel when not receiving the change instruction from the change instructor 254.

Additionally, in the slave 2 of the energy management system 10 of the present embodiment, the interference evaluator 253 has a function of detecting an available channel which is less likely to cause interference from the channels in the selectable range, and thereafter of providing the information of the detected available channel to the change instructor 254. The change instructor 254 is configured to instruct the channel selector 252 to change the current channel to one selected from the available channels indicated by the information provided from the interference evaluator 253.

Further, in the slave 2 of the energy management system 10 of the present embodiment, the change instructor 254 is configured to instruct the channel selector 252 to change the channel used by the second interface unit 22 from the current channel to an available channel that is less likely to cause interference when the third interface unit 23 acknowledges the start of use of the maintenance terminal 4 in a case where the channel used by the second interface unit 22 is same as the channel used by the maintenance terminal 4.

Moreover, the slave 2 of the energy management system 10 of the present embodiment further includes the communication quality evaluator 255 and the power instructor 256. The communication quality evaluator 255 is configured to perform test communication by use of the channel selected by the channel selector 252 to evaluate the communication quality between the slave 2 and the electric appliance 9 through the communication path 12. The power instructor 256 is configured to decrease the output power of the second interface unit 22 down to the allowable lower limit within the range in which the communication quality is kept fine.

Furthermore, in the slave 2 of the energy management system 10 of the present embodiment, the channel selector 252 may select a frequency used for communication. Alternatively, the channel selector 252 may select a time slot used for communication. Alternatively, the channel selector 252 may select a combination of a frequency and a time slot used for communication.

Additionally, with regard to the slave 2 of the energy management system 10 of the present embodiment, the identification information held in the identification information holding unit 251 is given by the upper device 30.

In other words, the slave 2 of the energy management system 10 of the present embodiment includes the following first to eleventh features. Note that, the second to eleventh features are optional.

In the first feature, the slave 2 is a slave suitable for energy management systems for collecting, from the energy meter 1 for measuring an amount of electric energy supplied from the power source (commercial AC power source) 14 to the predetermined place (facility 100) through the distribution line 5, the meter-reading data containing the amount of electric energy. The slave 2 includes the first interface unit 21, the second interface unit 22, the third interface unit 23, and the controller 25. The first interface unit 21 is configured to communicate with the upper device 30. The second interface unit 22 is configured to communicate with the electric appliance 9 installed in the predetermined place (facility 100). The third interface unit 23 is configured to perform the first wireless communication using an electric wave with the communication terminal 4. The controller 25 has: the function of obtaining the meter-reading data from the energy meter 1; the function of controlling the first interface unit 21 to send the meter-reading data to the upper device 30; and the function of controlling the third interface unit 23 to send the meter-reading data to the communication terminal 4. One of the first interface unit 21 and the second interface unit 22 is the wired communication unit configured to perform the power line communication using the distribution line 5, and the other of the first interface unit 21 and the second interface unit 22 is the wireless communication unit configured to perform the second wireless communication using an electric wave.

In the second feature based on the first feature, the energy meter 1 is connected to the power source 14 through the transformer 6 configured to adjust electricity from the power source 14 to electricity appropriate to the predetermined place. The distribution line 5 includes the first path 501 between the power source 14 and the transformer 6, and the second path 502 between the transformer 6 and the energy meter 1. The upper device 30 is connected to the second path 502. The first interface unit 21 is the wired communication unit and is configured to perform the power line communication with the upper device 30 through the second path 502.

In the third feature based on the first or second feature, the controller 25 includes the channel selector 252, the interference evaluator 253, and the change instructor 254. The channel selector 252 is configured to select a communication channel to be used for wireless communication from a plurality of channels. The interference evaluator 253 is configured to judge whether interference of electric waves occurs in the communication channel. The change instructor 254 is configured to provide the change instruction to the channel selector 252 when the interference evaluator 253 determines that the interference occurs. The channel selector 252 is configured to change the communication channel in response to reception of the change instruction from the change instructor 254.

In the fourth feature based on the third feature, the controller 25 includes the identification information holding unit 251 storing the identification information unique to the slave 2. The channel selector 252 is configured to select from the plurality of channels the initial channel as the candidate for the communication channel, depending on the identification information stored in the identification information holding unit 251. The channel selector 252 is configured to, when receiving the change instruction from the change instructor 254, select from the plurality of channels a channel different from the initial channel, and set the selected channel as the communication channel. The channel selector 252 is configured to, when not receiving the change instruction from the change instructor 254, set the initial channel as the communication channel.

In the fifth feature based on the third or fourth feature, the interference evaluator 253 is configured to judge whether the plurality of channels includes at least one available channel that does not cause interference of the electric wave. The interference evaluator 253 is configured to, when determining that the plurality of channels includes the available channel, provide available channel information identifying the at least one available channel to the change instructor 254. The change instructor 254 is configured to select a designated available channel to be set as the communication channel from the at least one available channel identified by the available channel information, and provide the change instruction indicating the designated available channel to the channel selector 252. The channel selector 252 is configured to, when receiving the change instruction from the change instructor 254, set the designated available channel indicated by the change instruction as the communication channel.

In the sixth feature based on any one of the third to fifth features, the controller 25 includes the communication quality evaluator 255 and the power instructor 256. The communication quality evaluator 255 is configured to evaluate a communication quality of the communication channel selected by the channel selector 252. The power instructor 256 is configured to set the intensity of the electric wave allocated to the communication channel to the lower limit of the range of intensities allowing the communication quality evaluated by the communication quality evaluator 255 to satisfy the predetermined condition.

In the seventh feature based on any one of the third to sixth features, the channel selector 252 is configured to designate the second communication channel to be used for the second wireless communication. The third interface unit 23 is configured to judge whether use of the communication terminal 4 is started. The change instructor 254 is configured to, when the third interface unit 23 determines that use of the communication terminal 4 is started, provide, to the channel selector 252, the change instruction that indicates, as the second communication channel, a channel that does not cause interference with a channel used by the communication terminal 4. The channel selector 252 is configured to, when receiving the change instruction from the change instructor 254, change the second communication channel to the channel indicated by the change instructor 254.

In the eighth feature based on the seventh feature, the controller 25 includes the second communication quality evaluator 255 and the second power instructor 256. The second communication quality evaluator 255 is configured to evaluate the communication quality of the second communication channel selected by the channel selector 252. The second power instructor 256 is configured to set then intensity of then electric wave allocated to the second communication channel to the lower limit of the range of intensities allowing the communication quality evaluated by the second communication quality evaluator 255 to satisfy the predetermined condition.

In the ninth feature based on any one of the third to eighth features, each of the plurality of channel is defined by a frequency, a time slot, or a combination of a frequency and a time slot.

In the tenth feature based on the fourth feature, the identification information is given by the upper device 30 to the slave 2.

In the eleventh feature based on any one of the first to tenth features, the slave 2 is attached to the energy meter 1.

According to the slave 2 of the energy management system 10 of the present embodiment described above, one of the first interface unit 21 and the second interface unit 22 performs the power line communication through the communication path using the distribution line 5 as the transmission medium, and the other performs the wireless communication through the communication path using the electric wave as the transmission medium. Hence, the slave 2 can communicate with the electric appliance 9 used in the facility 100 in addition to the upper device 30 and nevertheless there is an advantage that it is possible to avoid interference between the communication between the slave 2 and the upper device 30 and the communication between the slave 2 and the upper device 30.

Further, the energy management system 10 of the present embodiment includes the master 3, the slave 2, and the maintenance terminal 4. The master 3 has the function of communicating with the upper server 8 configured to collect the meter-reading data including the amount of energy consumed in the facility 100 measured by the energy meter 1 from the energy meters 1 of the plurality of facilities 100 in the management area, and of transmitting the meter-reading data obtained from the energy meter 1 of the at least one facility 100 to the upper server 8. The slave 2 is attached to the energy meter 1, and has the function of transmitting the meter-reading data to the master 3. The maintenance terminal 4 has at least the function of obtaining the meter-reading data from the slave 2. The slave 2 includes the first interface unit 21, the second interface unit 22, and the third interface unit 23. The first interface unit 21 is configured to communicate with the master 3 through the first communication path 11. The second interface unit 22 is configured to communicate with the electric appliance 9, that is one of electric appliances used in the facility 100 and has the communication function, through the second communication path 12. The third interface unit 23 is configured to perform wireless communicate with the maintenance terminal 4 having at least the function of obtaining the meter-reading data through the third communication path 13 using the electric wave as the transmission medium. An interface unit that is one of the first interface unit 21 and the second interface unit 22 performs the power line communication through the communication path using the distribution line 5 as the transmission medium, and a further interface unit that is the other of the first interface unit 21 and the second interface unit 22 performs the wireless communication through the communication path using the electric wave as the transmission path.

In other words, the energy management system 10 of the present embodiment includes the following twelfth to fourteenth features. Note that, the thirteenth and fourteenth features are optional.

In the twelfth feature, the energy management system 10 includes the slave 2, the upper device 30, and the communication terminal 4. The slave 2 is configured to obtain, from the energy meter 1 for measuring the amount of electric energy supplied from the power source 14 to the predetermined place through the distribution line 5, the meter-reading data containing the amount of electric energy. The upper device 30 is configured to obtain the meter-reading data from the slave 2. The communication terminal 4 is configured to obtain the meter-reading data from the slave 2. The slave 2 includes the first interface unit 21, the second interface unit 22, and the third interface unit 23. The controller 25 is configured to obtain the meter-reading data. The first interface unit 21 is configured to communicate with the upper device 30. The second interface unit 22 is configured to communicate with the electric appliance 9 installed in the predetermined place. The third interface unit 23 is configured to perform the first wireless communication using an electric wave with the communication terminal 4. The controller 25 has: the function of obtaining the meter-reading data from the energy meter 1; the function of controlling the first interface unit 21 to send the meter-reading data to the upper device 30; and the function of controlling the third interface unit 23 to send the meter-reading data to the communication terminal 4. One of the first interface unit 21 and the second interface unit 22 is the wired communication unit configured to perform the power line communication using the distribution line 5, and the other of the first interface unit 21 and the second interface unit 22 is the wireless communication unit configured to perform the second wireless communication using an electric wave.

In the thirteen feature based on the twelfth feature, the upper device 30 includes the master 3 connected to the distribution line 5 and the upper server 8 connected to the master 3. The master 3 has the function of obtaining the meter-reading data from the slave 2, and the function of sending the meter-reading data obtained from the slave 2 to the upper server 8. The upper server 8 is configured to store the meter-reading data received from the master 3.

In the fourteenth feature based on the twelfth or thirteenth feature, the communication terminal 4 has the function of communicating with the electric appliance 9.

According to the energy management system 10 of the present embodiment described above, one of the first interface unit 21 and the second interface unit 22 performs the power line communication through the communication path using the distribution line 5 as the transmission medium, and the other performs the wireless communication through the communication path using the electric wave as the transmission medium. Hence, the slave 2 can communicate with the electric appliance 9 used in the facility 100 in addition to the upper device 30 and nevertheless there is an advantage that it is possible to avoid interference between the communication between the slave 2 and the upper device 30 and the communication between the slave 2 and the upper device 30.

Second Embodiment

The energy management system 10 of the present embodiment is different from the energy management system 10 of the first embodiment in that the first interface unit 21 of the slave 2 is configured to communicate with the master 3 in a wireless communication manner through the first communication path 11 using the electric wave as the transmission medium. Hereinafter, the same components as those of the first embodiment are designated by the same reference signs and explanations thereof are deemed unnecessary.

In the present embodiment, the second interface unit 22 of the slave 2 is connected to a distribution line 51 (see FIG. 9) on a downstream side of the energy meter 1, and is configured to perform the power line communication with the electric appliance 9 through the second communication path 12 using this distribution line 51 as the transmission medium. In other words, the second interface unit 22 uses, as the second communication path 12, the distribution line 51 that is inside the facility 100 and is used for supplying the commercial power from the energy meter 1 to the electric appliance 9 in the facility 100.

Hence, in the slave 2 of the energy management system 10 of the present embodiment, the interface unit is the second interface unit 22 and performs the power line communication with the electric appliance 9 through the second communication path 12 using the distribution line 5 (51) on the downstream side of the energy meter 1 as the transmission medium.

In the present embodiment, the electric appliance 9 is connected to the distribution line 5. The energy meter 1 is interposed between the power source 14 and the electric appliance 9 in the distribution line 5. The distribution line 5 includes the first distribution line (the first path 501 and the second path 502) between the energy meter 1 and the power source 14, and the second distribution line 51 between the energy meter 1 and the electric appliance 9.

In summary, as shown in FIG. 9, the slave 2 performs the wireless communication with the master 3 through the first communication path 11 in which the electric wave is used as the transmission medium, and performs the power line communication with the electric appliance 9 through the second communication path 12 in which the distribution line 51 is used the transmission medium.

In the slave 2 of this energy management system 10, one (in this embodiment, second) interface unit selected from the first interface unit 21 and the second interface unit 22 performs the power line communication, and the other (in this embodiment, first) interface unit performs the wireless communication. In other words, in the present embodiment, the first interface unit 21 is the wireless communication unit and is configured to perform the second wireless communication using the electric wave with the upper device 30. Further, the second interface unit 22 is the wired communication unit and is configured to perform the power line communication with the electric appliance 9 through the second distribution line 51.

Hence, according to this energy management system 10, one of the communication between the slave 2 and the master 3 and the communication between the slave 2 and the electric appliance 9 is the power line communication and the other is the wireless communication. Consequently, the traffic of one communication is separated from the traffic of the other communication, and thus the interference of the communications can be avoided.

Note that, the communication between the first interface unit 21 and the master 3 may be implemented by use of Wi-Fi (registered trademark), a PHS (Personal Handyphone System) line, or the like.

According to the energy management system 10 of the present embodiment as described above, the power line communication is used for the communication between the slave 2 and the electric appliance 9, and therefore the communication reliability between the slave 2 and the electric appliance 9 is improved relative to a case in which the wireless communication is used.

In this embodiment, the slave 2 may be configured such that the first interface unit 21 and the third interface unit 23 use the same protocol to perform wireless communication. In this configuration, the first interface unit 21 and the third interface unit 23 of the slave 2 can be implemented by a single communication module, and thus the slave 2 can be downsized and be manufactured at a lowered cost.

Alternatively, the first interface unit 21 and the third interface unit 23 may be configured to use different protocols to perform wireless communication so that the first communication path 11 and the third communication path 13 form independent communication paths. In this configuration, the communication between the slave 2 and the maintenance terminal 4 and the communication between the slave 2 and the master 3 can be performed through independent communication paths. Accordingly, this energy management system 10 can avoid interference between the communication between the slave 2 and the maintenance terminal 4 and the communication between the slave 2 and the master 3.

Note that, even in a case where the second interface unit 22 uses the distribution line 51 as the transmission medium to perform the power line communication like the present embodiment, it may be necessary that the communication area of the second interface unit 22 is limited so that the slave 2 is allowed to communicate with the electric appliance 9 in the facility associated with the slave 2 but is not allowed to communicate with the electric appliance 9 in a neighboring facility. In view of this, as with the first embodiment, the slave 2 of the present embodiment is configured to select channels to be used by the second interface unit 22 and the third interface unit 23 from the plurality of channels in the predetermined selectable range. Each channel is defined by at least one of a frequency and a time slot.

In the slave 2 of the energy management system 10 of the present embodiment described above, the interface unit is the second interface unit 22, and is configured to perform the power line communication with the electric appliance 9 through the second communication path 12 in which the transmission medium is defined by the distribution line 5 (51) on the downstream side of the energy meter 1.

In other words, the slave 2 of the present embodiment includes the following fifteenth feature in addition to the above first feature. In the fifteenth feature, the electric appliance 9 is connected to the distribution line 5. The energy meter 1 is interposed between the power source 14 and the electric appliance 9 in the distribution line 5. The distribution line 5 includes the first distribution line (the first path 501 and the second path 502) between the energy meter 1 and the power source 14, and the second distribution line 51 between the energy meter 1 and the electric appliance 9. The second interface unit 22 is the wired communication unit and is configured to perform the power line communication with the electric appliance 9 through the second distribution line 51.

In the slave 2 of the present embodiment, the first interface unit 21 and the third interface unit 23 may perform wireless communication by use of the same protocol.

In other words, the slave 2 of the present embodiment may include the following sixteenth feature in addition to the fifteenth feature. In the sixteenth feature, the first interface unit 21 is the wireless communication unit. The first interface unit 21 and the third interface unit 23 are configured to use the same protocol.

Alternatively, in the slave 2 of the present embodiment, the first interface unit 21 and the third interface unit 23 may perform wireless communication by use of different protocols so that the first communication path 11 and the third communication path 13 form independent communication paths.

In other words, the slave 2 of the present embodiment may include the following seventeenth feature in addition to the fourteenth feature. In the seventeenth feature, the first interface unit 21 is the wireless communication unit. The first interface unit 21 and the third interface unit 23 are configured to use different protocols.

Note that, the slave 2 of the present embodiment may include the aforementioned third to eleventh features, as needed.

Optionally, the slave 2 of the present embodiment may further include the seventh feature. In this case, the third interface unit 23 is configured to judge whether use of the communication terminal (maintenance terminal) 4 is started. The change instructor 254 is configured to, when the third interface unit 23 determines that use of the communication terminal 4 is started, provide to the channel selector 252 the change instruction that indicates, as the second communication channel, a channel that does not cause interference with a channel used by the communication terminal 4. The channel selector 252 is configured to, when receiving the change instruction from the change instructor 254, change the second communication channel to the channel indicated by the change instructor 254. Consequently, the channel used by the wireless communication unit (the first interface unit 21) is changed.

Optionally, the slave 2 of the present embodiment may further include the eighth feature. In this case, the communication quality evaluator 255 functions as the second communication quality evaluator configured to conduct test communication by use of the second communication channel selected by the channel selector 252 to evaluate the communication quality of the communication path of the second wireless communication (in the present embodiment, the first communication path 11 that is the communication path between the slave 2 and the upper device 30). Further, the power instructor 256 serves as the second power instructor configured to decrease the intensity of the electric wave outputted from the wireless communication unit (in the present embodiment, the first interface unit 21) within a range in which the communication quality (communication quality of the first communication path 11) evaluated by the communication quality evaluator (second communication quality evaluator) 255 fulfills the predetermined condition.

The other configurations and functions are same as those of the first embodiment.

The invention claimed is:

1. A slave suitable for energy management systems for collecting, from an energy meter for measuring an amount of electric energy supplied from a power source to a predetermined place through a distribution line, meter-reading data containing the amount of electric energy,
   the slave comprising:
   a first interface unit configured to communicate with an upper device;
   a second interface unit configured to communicate with an electric appliance installed in the predetermined place;
   a third interface unit configured to perform first wireless communication using an electric wave with a communication terminal; and
   a controller having: a function of obtaining the meter-reading data from the energy meter; a function of controlling the first interface unit to send the meter-reading data to the upper device; and a function of controlling the third interface unit to send the meter-reading data to the communication terminal,
   one of the first interface unit and the second interface unit being a wired communication unit configured to perform power line communication using the distribution line, and
   the other of the first interface unit and the second interface unit being a wireless communication unit configured to perform second wireless communication using an electric wave,
   wherein the controller includes:
     a channel selector configured to select a communication channel to be used for wireless communication from a plurality of channels,
     an interference evaluator configured to judge whether interference of electric waves occurs in the communication channel, and
     a change instructor configured to provide a change instruction to the channel selector when the interference evaluator determines that the interference occurs;
   the channel selector is configured to change the communication channel in response to reception of the change instruction from the change instructor;
   the channel selector is configured to designate a second communication channel to be used for the second wireless communication;
   the third interface unit is configured to judge whether use of the communication terminal is started;
   the change instructor is configured to, when the third interface unit determines that use of the communication terminal is started, provide to the channel selector the change instruction that indicates, as the second communication channel, a channel that does not cause interference with a channel used by the communication terminal; and
   the channel selector is configured to, when receiving the change instruction from the change instructor, change the second communication channel to the channel indicated by the change instructor.

2. The slave suitable for energy management systems, according to claim 1, wherein:
   the controller includes an identification information holding unit storing identification information unique to the slave;
   the channel selector is configured to select from the plurality of channels an initial channel as a candidate for the communication channel, depending on the identification information stored in the identification information holding unit;
   the channel selector is configured to, when receiving the change instruction from the change instructor, select from the plurality of channels a channel different from the initial channel, and set the selected channel as the communication channel; and the channel selector is configured to, when not receiving the change instruction from the change instructor, set the initial channel as the communication channel.

3. The slave suitable for energy management systems, according to claim 1, wherein:
the interference evaluator is configured to judge whether the plurality of channels includes at least one available channel that does not cause interference of the electric wave;
the interference evaluator is configured to, when determining that the plurality of channels includes the available channel, provide available channel information identifying the at least one available channel to the change instructor;
the change instructor is configured to select a designated available channel to be set as the communication channel from the at least one available channel identified by the available channel information, and provide the change instruction indicating the designated available channel to the channel selector; and
the channel selector is configured to, when receiving the change instruction from the change instructor, set the designated available channel indicated by the change instruction as the communication channel.

4. The slave suitable for energy management systems, according to claim 1, wherein the controller further includes:
a communication quality evaluator configured to evaluate a communication quality of the communication channel selected by the channel selector, and
a power instructor configured to set an intensity of an electric wave allocated to the communication channel to a lower limit of a range of intensities allowing the communication quality evaluated by the communication quality evaluator to satisfy a predetermined condition.

5. The slave suitable for energy management systems, according to claim 1, wherein the controller further includes:
a second communication quality evaluator configured to evaluate a communication quality of the second communication channel selected by the channel selector, and
a second power instructor configured to set an intensity of an electric wave allocated to the second communication channel to a lower limit of a range of intensities allowing the communication quality evaluated by the communication quality evaluator to satisfy a predetermined condition.

6. The slave suitable for energy management systems according to claim 1, wherein each of the plurality of channel is defined by a frequency, a time slot, or a combination of a frequency and a time slot.

7. The slave suitable for energy management systems according to claim 2, wherein the identification information is given by the upper device to the slave.

8. An energy management system comprising:
a slave configured to obtain, from an energy meter for measuring an amount of electric energy supplied from a power source to a predetermined place through a distribution line, meter-reading data containing the amount of electric energy;
an upper device configured to obtain the meter-reading data from the slave;
a communication terminal configured to obtain the meter-reading data from the slave, the slave including:
a first interface unit configured to communicate with the upper device;
a second interface unit configured to communicate with an electric appliance installed in the predetermined place;
a third interface unit configured to perform first wireless communication using an electric wave with the communication terminal; and
a controller having: a function of obtaining the meter-reading data from the energy meter; a function of controlling the first interface unit to send the meter-reading data to the upper device; and a function of controlling the third interface unit to send the meter-reading data to the communication terminal,
one of the first interface unit and the second interface unit being a wired communication unit configured to perform power line communication using the distribution line, and
the other of the first interface unit and the second interface unit being a wireless communication unit configured to perform second wireless communication using an electric wave,
wherein the controller includes:
a channel selector configured to select a communication channel to be used for wireless communication from a plurality of channels,
an interference evaluator configured to judge whether interference of electric waves occurs in the communication channel, and
a change instructor configured to provide a change instruction to the channel selector when the interference evaluator determines that the interference occurs;
the channel selector is configured to change the communication channel in response to reception of the change instruction from the change instructor;
the channel selector is configured to designate a second communication channel to be used for the second wireless communication;
the third interface unit is configured to judge whether use of the communication terminal is started;
the change instructor is configured to, when the third interface unit determines that use of the communication terminal is started, provide to the channel selector the change instruction that indicates, as the second communication channel, a channel that does not cause interference with a channel used by the communication terminal; and
the channel selector is configured to, when receiving the change instruction from the change instructor, change the second communication channel to the channel indicated by the change instructor.

9. The energy management system according to claim 8, wherein:
the upper device includes a master connected to the distribution line and an upper server connected to the master;
the master has a function of obtaining the meter-reading data from the slave, and a function of sending the meter-reading data obtained from the slave to the upper server; and
the upper server is configured to store the meter-reading data received from the master.

10. The energy management system according to claim 8, wherein the communication terminal has a function of communicating with the electric appliance.

\* \* \* \* \*